United States Patent
Sato

(10) Patent No.: US 11,870,110 B2
(45) Date of Patent: Jan. 9, 2024

(54) METHOD OF AGING FUEL CELL

(71) Applicant: HONDA MOTOR CO., LTD., Tokyo (JP)

(72) Inventor: Koichiro Sato, Tokyo (JP)

(73) Assignee: Honda Motor Co., Ltd., Tokyo (JP)

(*) Notice: Subject to any disclaimer, the term of this patent is extended or adjusted under 35 U.S.C. 154(b) by 5 days.

(21) Appl. No.: 17/677,908

(22) Filed: Feb. 22, 2022

(65) Prior Publication Data

US 2022/0311023 A1    Sep. 29, 2022

(30) Foreign Application Priority Data

Mar. 26, 2021   (JP) ................. 2021-052595

(51) Int. Cl.
  *H01M 8/043* (2016.01)
  *H01M 8/04858* (2016.01)
  *H01M 8/04746* (2016.01)
  *H01M 8/04119* (2016.01)

(52) U.S. Cl.
  CPC ....... *H01M 8/043* (2016.02); *H01M 8/04126* (2013.01); *H01M 8/04783* (2013.01); *H01M 8/04865* (2013.01)

(58) Field of Classification Search
  CPC ............. H01M 8/043; H01M 8/04126; H01M 8/04783; H01M 8/04865
  See application file for complete search history.

(56) References Cited

U.S. PATENT DOCUMENTS

| 2005/0095472 A1 | 5/2005 | Schrooten et al. |
| 2013/0171529 A1* | 7/2013 | Kato ............... H01M 8/2457 429/409 |
| 2018/0261858 A1* | 9/2018 | Zhang ............ H01M 8/04223 |
| 2019/0006687 A1* | 1/2019 | Tsuge ............. H01M 8/04029 |

FOREIGN PATENT DOCUMENTS

| JP | H06-251788 A | 9/1994 |
| JP | 2007-517359 A | 6/2007 |
| JP | 2017079194 A * | 4/2017 |
| JP | 2018-067499 A | 4/2018 |
| JP | 2020-161427 A | 10/2020 |

OTHER PUBLICATIONS

English Translation of JP2017079194A (Year: 2017).*
Office Action dated Oct. 11, 2022 issued over the corresponding Japanese Patent Application No. 2021-052595 with the English translation thereof.

* cited by examiner

*Primary Examiner* — Stewart A Fraser
(74) *Attorney, Agent, or Firm* — Carrier, Shende & Associates P.C.; Joseph P. Carrier; Jeffrey T. Gedeon

(57) ABSTRACT

A control unit of an aging apparatus performs a first pattern of supplying a humidified $H_2$ gas to an anode and supplying a humidified $N_2$ gas to a cathode, to thereby move protons from the anode to the cathode through an electrolyte membrane. Further, the control unit performs a second pattern of supplying the humidified $N_2$ gas to the anode and supplying the humidified $H_2$ gas to the cathode, to thereby move protons from the cathode to the anode through the electrolyte membrane.

8 Claims, 14 Drawing Sheets

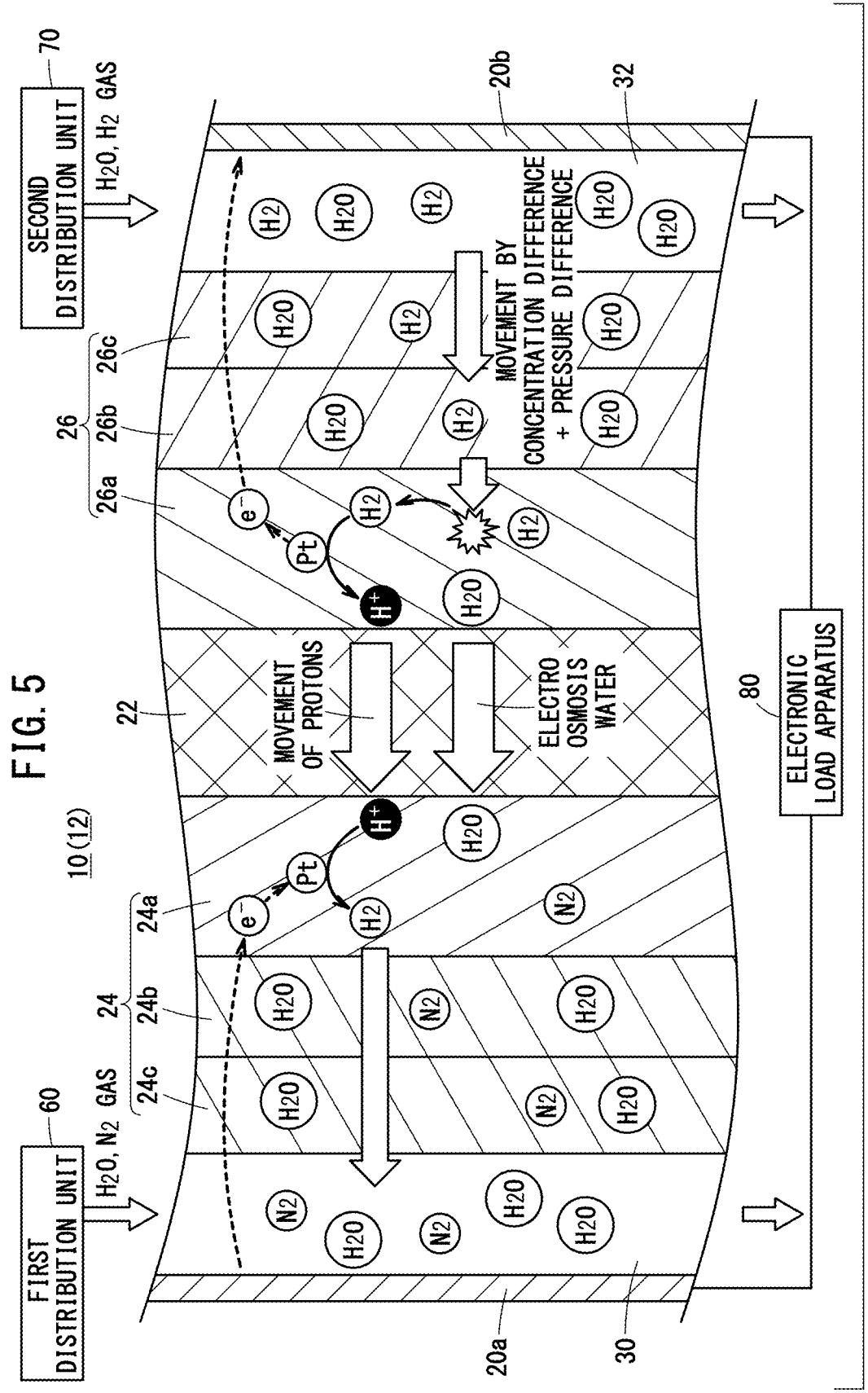

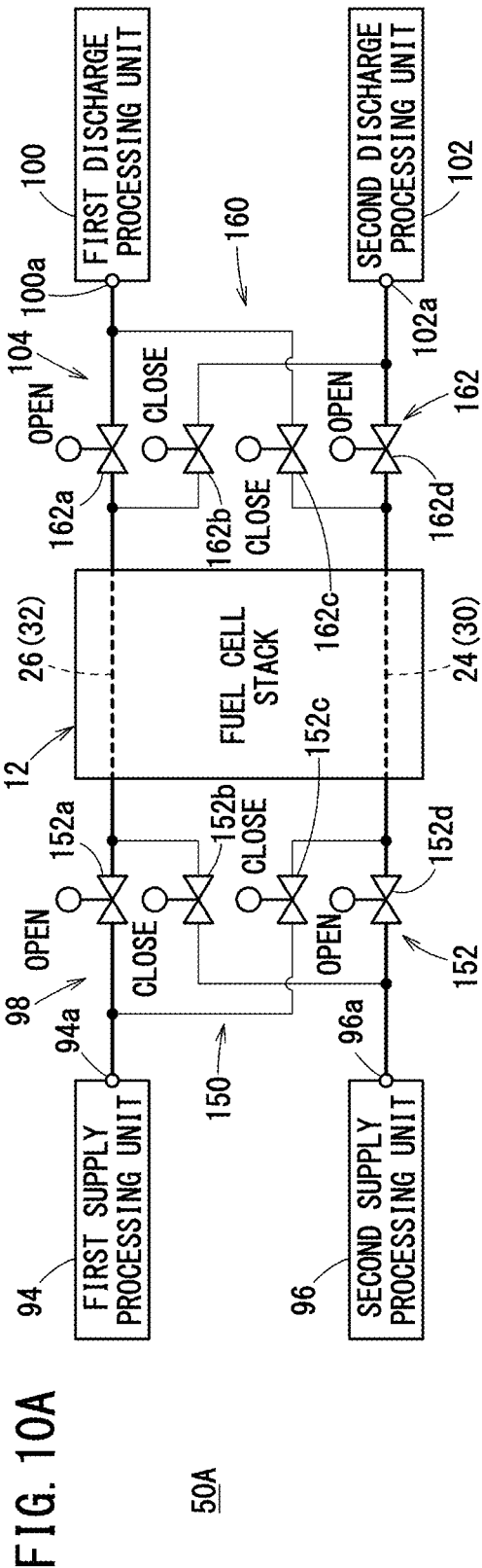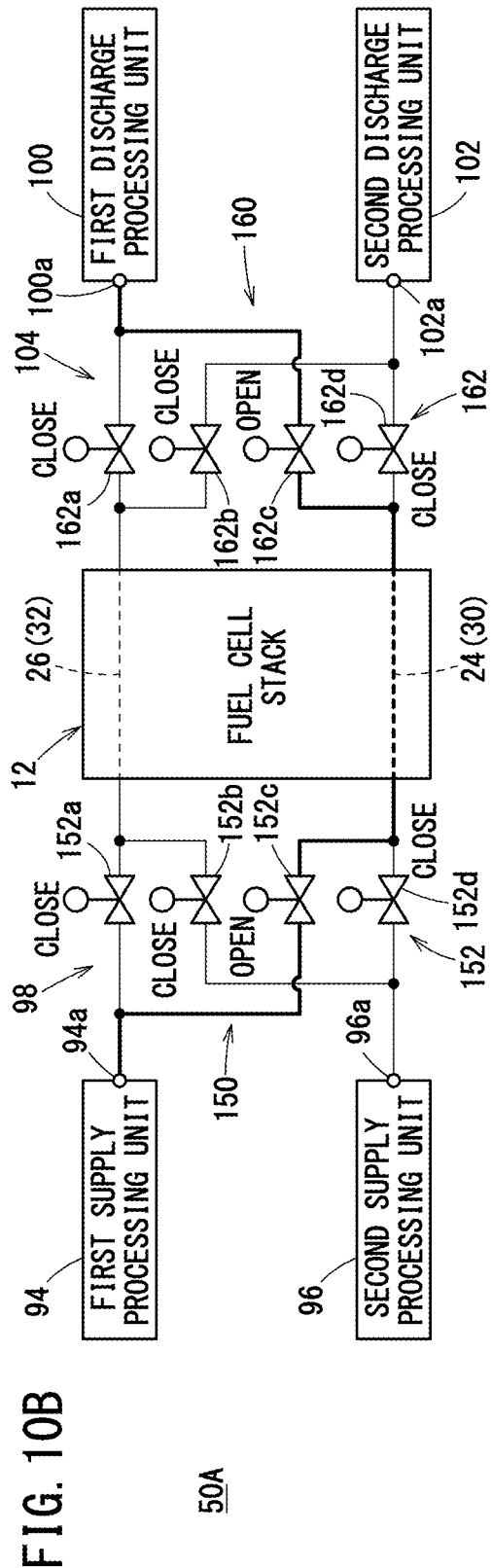

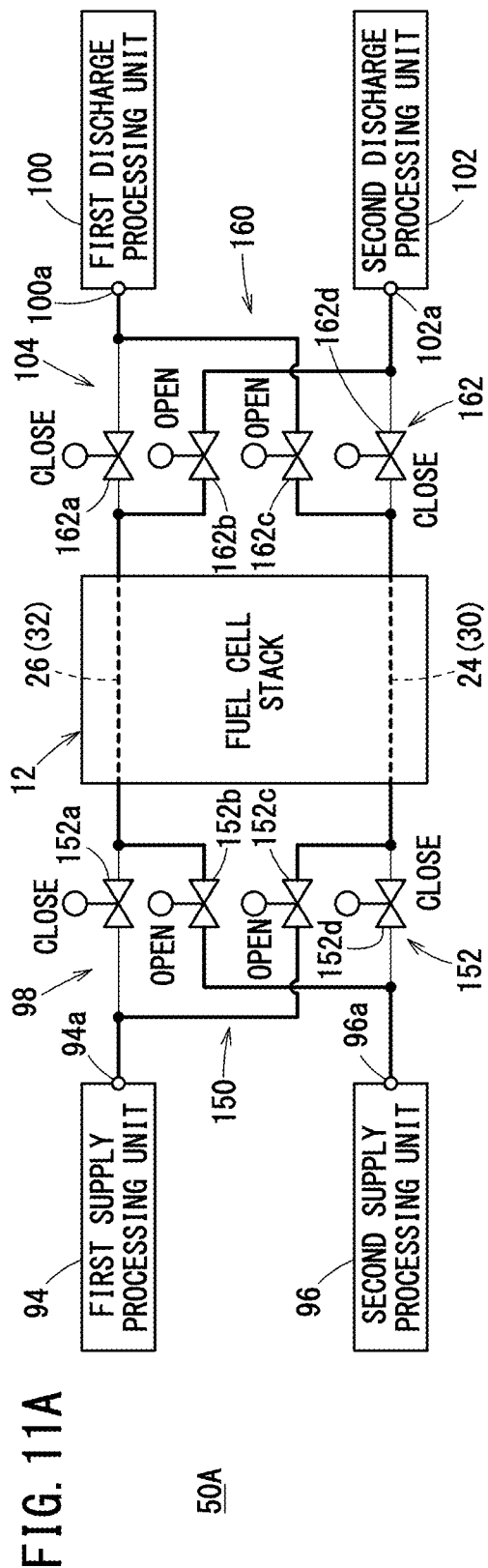
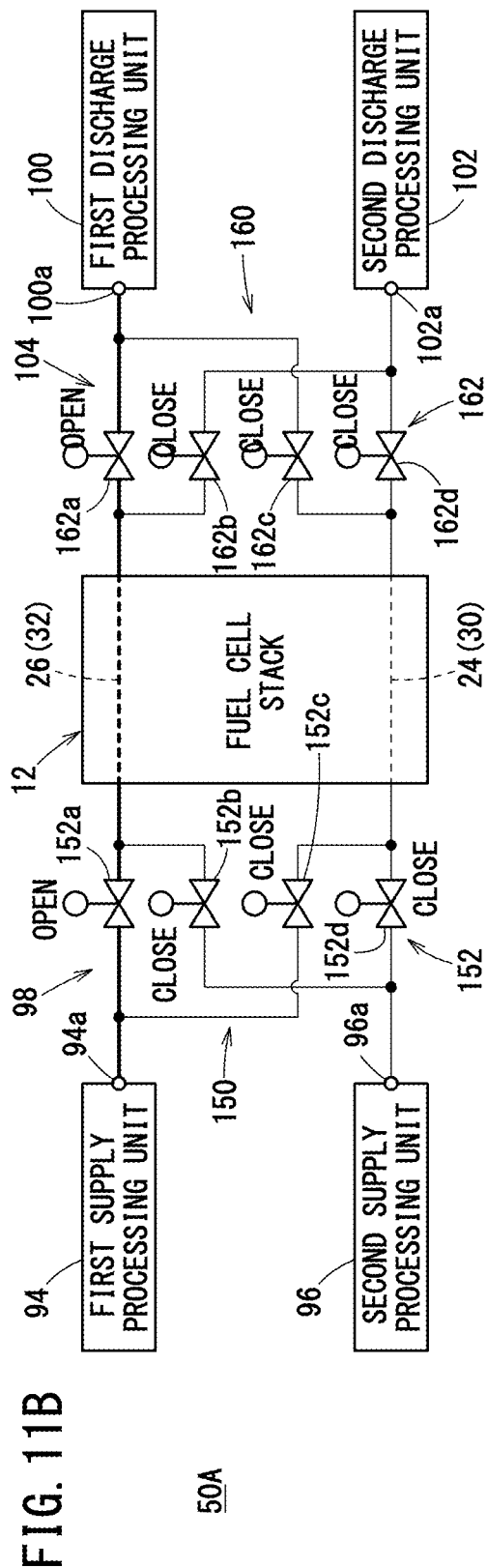
FIG. 11A
FIG. 11B

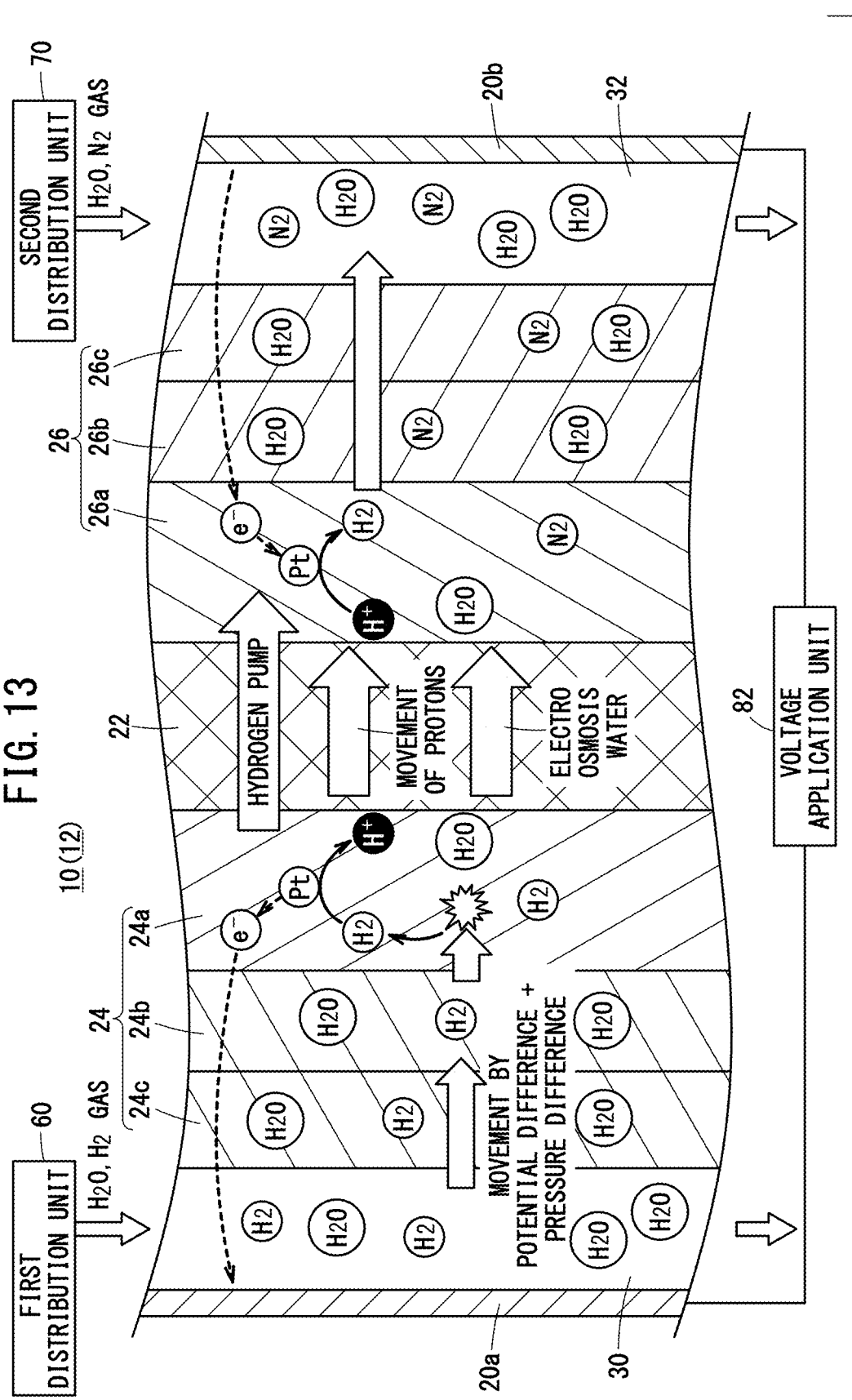

METHOD OF AGING FUEL CELL

CROSS-REFERENCE TO RELATED APPLICATIONS

This application is based upon and claims the benefit of priority from Japanese Patent Application No. 2021-052595 filed on Mar. 26, 2021, the contents of which are incorporated herein by reference.

BACKGROUND OF THE INVENTION

Field of the Invention

The present invention relates to a method of aging a fuel cell, and an aging apparatus.

Description of the Related Art

A fuel cell includes a membrane electrode assembly (MEA) including an electrolyte membrane and a pair of electrodes stacked on both surfaces of the electrolyte membrane. Further, the fuel cell includes a pair of separators (bipolar plates) provided on electrode surfaces of the MEA. A plurality of the fuel cells are stacked together and assembled into a fuel cell stack. In producing the fuel cell stack (or the fuel cells), after assembling thereof, aging is performed so that the fuel cells can perform desired performance.

For example, JP 2018-067499 A discloses an aging method in which a hydrogen gas is contained in an anode of a fuel cell stack, an oxygen-containing gas and an inert gas are alternately supplied to a cathode multiple times, and thereafter, hot water is filled in the anode and the cathode. However, in the aging method, when protons generated from ionization of hydrogen moves through the electrolyte membrane, the protons are not accompanied by electro osmosis water. Therefore, the electrolyte membrane is not humidified sufficiently.

SUMMARY OF THE INVENTION

That is, in order to humidify the inside of the electrolyte membrane, preferably, a humidified hydrogen gas is supplied during power generation, to move protons through the electrolyte membrane. However, supply and humidification of the hydrogen gas has the relationship of trade off. When water which accompanies the hydrogen gas is increased, a liquid water film is created in the electrode to thereby decrease the gas diffusion performance, and consequently the amount of generated protons is decreased. Conversely, when water which accompanies the hydrogen gas is decreased, humidification of the electrolyte membrane becomes insufficient.

The present invention has been made taking the above circumstances into account, and an object of the present invention is to provide a method of aging a fuel cell and an aging apparatus which is capable of facilitating humidification of an electrolyte membrane to a greater extent to thereby achieve improvement in the aging efficiency.

In order to achieve the above object, according to a first aspect of the present invention, a method of aging a fuel cell is provided. The fuel cell includes an electrolyte membrane, and a pair of electrodes provided on both surfaces of the electrolyte membrane. The method includes the steps of performing a first pattern of supplying a humidified hydrogen gas to one electrode of the pair of electrodes and supplying a humidified inert gas to another electrode of the pair of electrodes to thereby move protons from the one electrode to the other electrode through the electrolyte membrane, and performing a second pattern of supplying the humidified inert gas to the one electrode and supplying the humidified hydrogen gas to the other electrode, to thereby move protons from the other electrode to the one electrode through the electrolyte membrane.

Further, in order to achieve the above object, according to a second aspect of the present invention, an aging apparatus is provided. The aging apparatus performs aging on a fuel cell. The fuel cell includes an electrolyte membrane and a pair of electrodes provided on both surfaces of the electrolyte membrane. The aging apparatus includes a hydrogen gas supply unit that supplies a humidified hydrogen gas to the fuel cell, an inert gas supply unit that supplies a humidified inert gas to the fuel cell, and the control unit that controls the hydrogen gas supply unit and the inert gas supply unit. The control unit performs a first pattern of supplying the humidified hydrogen gas to one electrode of the pair of electrodes and supplying the humidified inert gas to the other electrode of the pair of electrodes to thereby move protons from the one electrode to the other electrode through the electrolyte membrane, and a second pattern of supplying the humidified inert gas to the one electrode and supplying the humidified hydrogen gas to the other electrode to thereby move the protons from the other electrode to the one electrode through the electrolyte membrane.

With the method of aging the fuel cell and the aging apparatus as described above, it becomes possible to facilitate humidification of the electrolyte membrane to a great extent, and achieve improvement in the aging efficiency.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 5 is an enlarged cross sectional view showing operation of the fuel cell in the second pattern of the concentration cell;

FIG. 10A is a diagram showing operation of a first pattern of the aging apparatus according to the modified embodiment, and FIG. 10B is a diagram showing a conditioning step after the first pattern of the aging apparatus according to the modified embodiment;

FIG. 11A is a diagram showing operation of the second pattern of the aging apparatus according to the modified embodiment, and FIG. 11B is a diagram showing a conditioning step after the second pattern of the aging apparatus according to the modified embodiment;

FIG. 13 is an enlarged cross sectional view showing operation of the fuel cell in the first pattern of a hydrogen pump.

DESCRIPTION OF THE INVENTION

Hereinafter, preferred embodiments of the present invention will be described in detail with reference to the accompanying drawings.

First Embodiment

Figure 1:
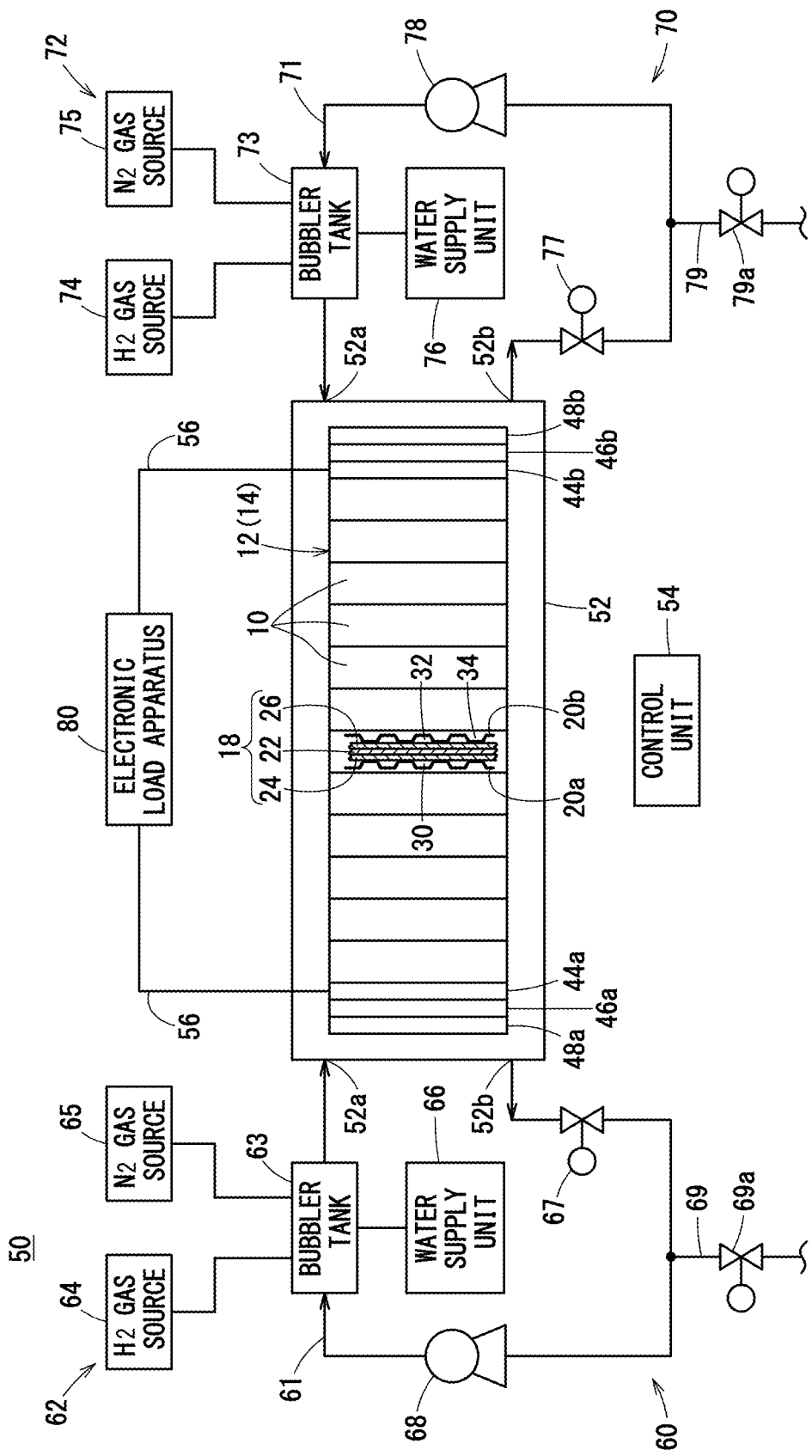
FIG. 1 is a diagram showing the structure of an aging apparatus for performing a method of aging a fuel cell, according to an embodiment of the present invention.

A method of aging a fuel cell 10 according to a first embodiment of the present invention uses an aging apparatus 50 shown in FIG. 1. A fuel cell stack 12 formed by stacking a plurality of the fuel cells 10 as unit power generation cells is set on the aging apparatus 50. The aging apparatus 50 supplies a humidified hydrogen gas and an inert gas to the fuel cell stack 12 to thereby perform aging which facilitate activation of the fuel cell 10, in order to improve the power generation performance of the fuel cell stack 12. Hereinafter, for ease of understanding of the invention, firstly, the structure of the fuel cell stack 12 will be described.

Figure 2:
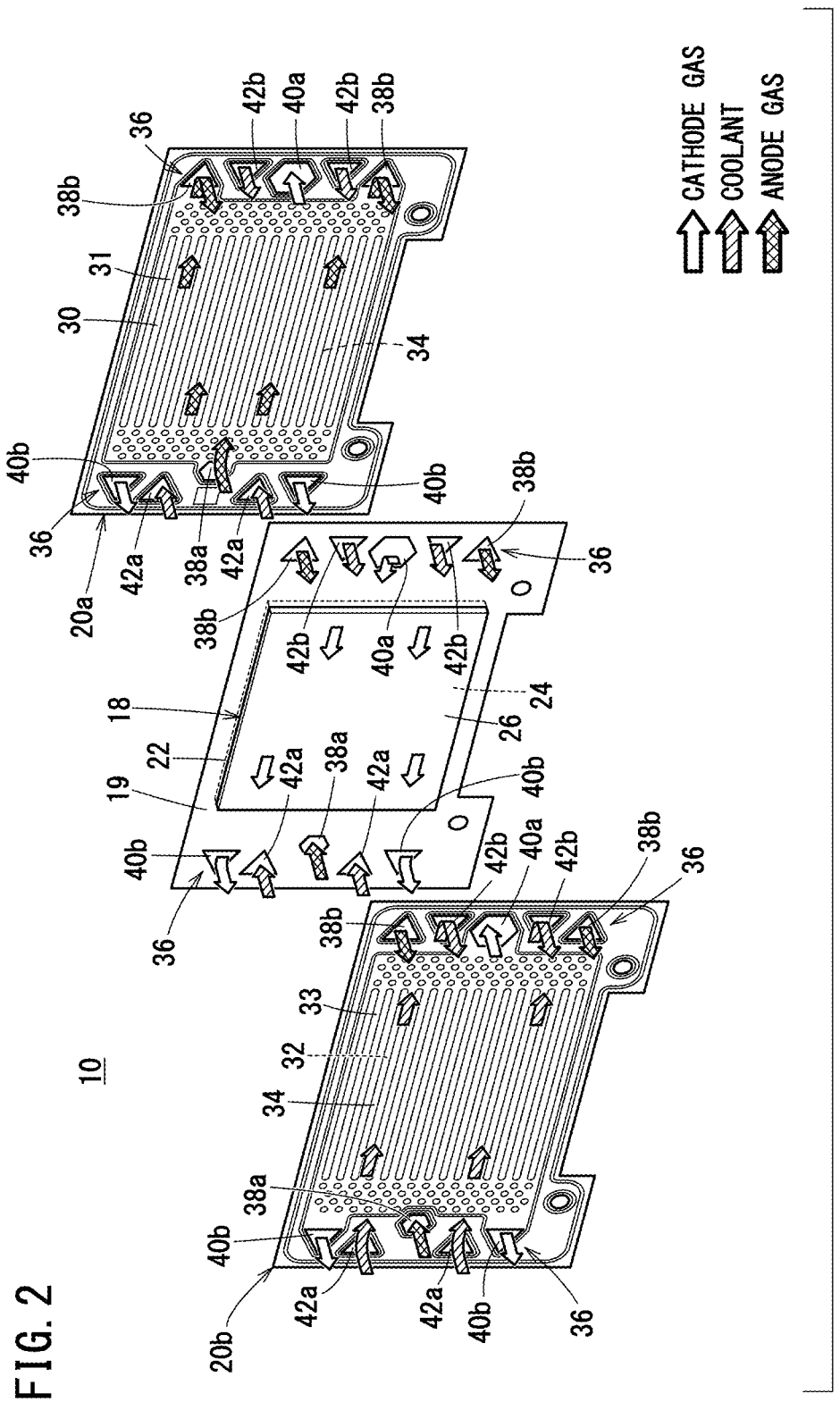
FIG. 2 is a perspective view showing a structure of the fuel cell.

The fuel cell stack 12 is formed by placing a stack body 14 formed by stacking a plurality of fuel cells 10 together in a stack case (not shown). As shown in FIG. 2, the fuel cell 10 includes a membrane electrode assembly 18 (hereinafter referred to as a MEA 18) having a resin frame 19 in an outer peripheral portion of the MEA 18, and a first separator 20a and a second separator 20b stacked on both surfaces of the MEA 18, respectively. In the fuel cell 10, an anode gas (fuel gas) such as hydrogen flows between the first separator 20a and the MEA 18, and a cathode gas (oxygen-containing gas) such as oxygen flows between the second separator 20b and the MEA 18. As a result, electrochemical reactions of the anode gas and the cathode gas are induced to generate electricity.

The MEA 18 includes an electrolyte membrane 22, an anode 24 provided on one surface of the electrolyte membrane 22, and a cathode 26 provided on the other surface of the electrolyte membrane 22. For example, the electrolyte membrane 22 is a solid polymer electrolyte membrane (cation ion exchange membrane) such as a thin membrane of perfluorosulfonic acid containing water. It should be noted that a fluorine based electrolyte may be used as the electrolyte membrane 22. Alternatively, an HC (hydrocarbon) based electrolyte may be used as the electrolyte membrane 22.

Figure 4:
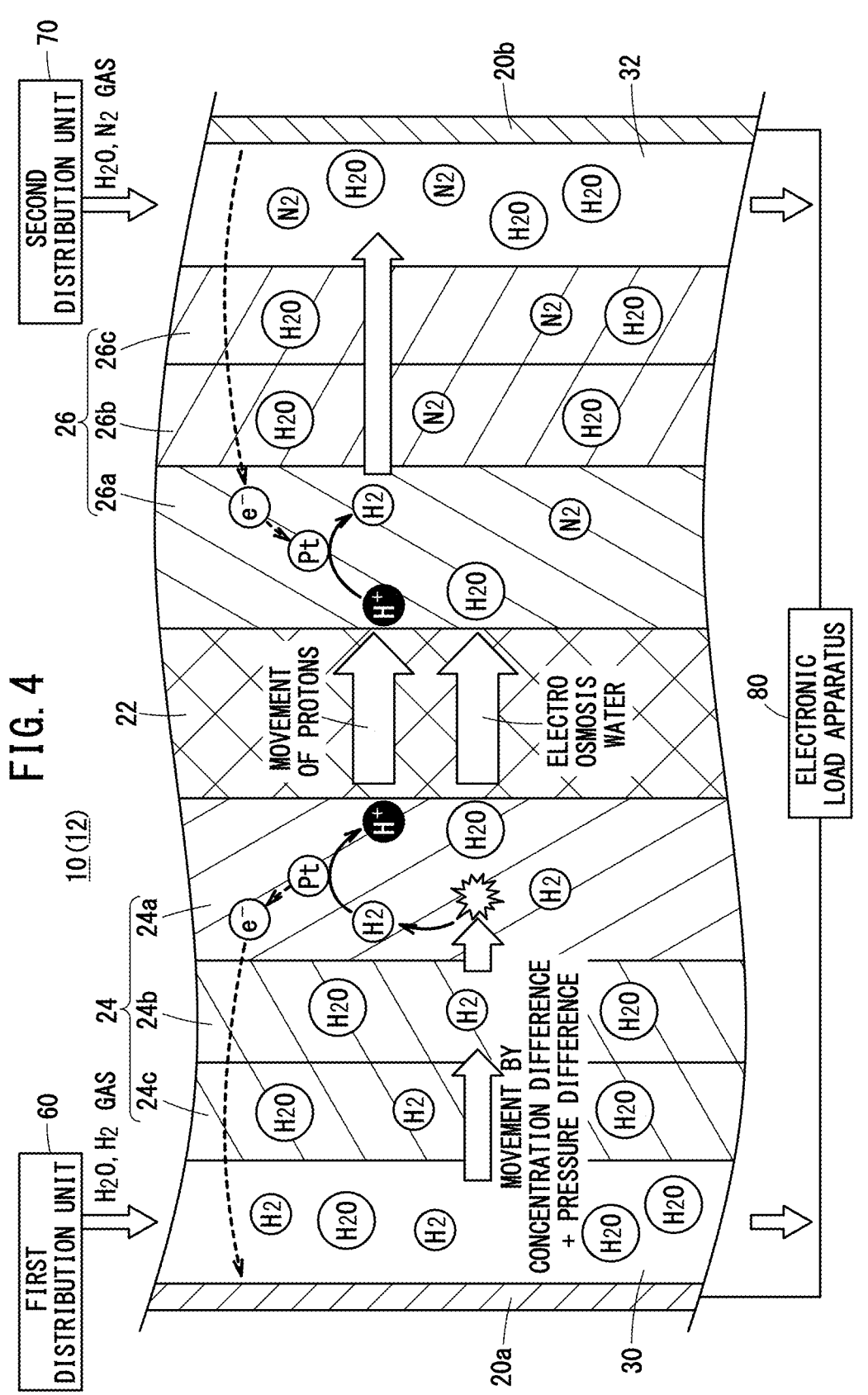
FIG. 4 is an enlarged cross sectional view showing operation of the fuel cell in the first pattern of the concentration cell.

Each of the anode 24 and the cathode 26 includes a catalyst layer 24a, 26a joined to the electrolyte membrane 22, a dense carbon layer 24b, 26b stacked on the catalyst layer 24a, 26a, and a gas diffusion layer 24c, 26c stacked on the dense carbon layer 24b, 26b (see FIG. 4). Each of the catalyst layers 24a, 26a is formed by depositing porous carbon particles uniformly on the surface of a carbon paper or carbon cloth, etc. together with ion conductive polymer binder, and platinum alloy is supported on surfaces of the carbon particles. The average diameter of a plurality of pores (average pore diameter) of the catalyst layers 24a, 26a is about 50 to 80 nm. The dense carbon layer 24b, 26b is formed of a carbon paper or carbon cloth, etc. and the average pore diameter of the dense carbon layer 24b, 26b is about 400 to 600 nm. The gas diffusion layer 24c is formed of a carbon paper or carbon cloth, etc., and the average pore diameter of the gas diffusion layer 24c is about 30 to $50 \times 10^3$ nm.

For example, each of the first separator 20a and the second separator 20b is a steel plate, a stainless steel plate, an aluminum plate, a plated steel plate, or a metal plate having an anti-corrosive surface by surface treatment to have a corrugated shape in cross section. In production of the fuel cell stack 12, outer peripheral portions of the first separator 20a of one fuel cell 10 and the second separator 20b of the other fuel cell 10 are joined together to form a joint separator, and the joint separators and the MEAs 18 are stacked together to form the stack body 14.

The first separator 20a has an anode flow field 30 as a passage of an anode gas on its surface facing the anode 24 of the MEA 18. The anode flow field 30 is formed by straight flow grooves (or wavy flow grooves) formed between a plurality of ridges 31 extending in a longitudinal direction of the first separator 20a.

The second separator 20b has a cathode flow field 32 as a passage of the cathode gas on its surface facing the cathode 26 of the MEA 18. (In FIG. 2, for convenience, the flow direction of the cathode gas is shown on the cathode 26.) The cathode flow field 32 is formed by straight flow grooves (or wavy flow grooves) formed between a plurality of ridges 33 extending in the longitudinal direction of the second separator 20b.

Further, a coolant flow field 34 as a passage of a coolant (e.g., water) is formed between surfaces of the first separator 20a and the second separator 20b which contact each other. When the first separator 20a and the second separator 20b are overlapped with each other, the coolant flow field 34 is formed between the back surface of the anode flow field 30 of the first separator 20a and the back surface of the cathode flow field 32 of the second separator 20b.

Further, the fuel cell 10 includes a plurality of fluid passages 36 for allowing the anode gas, the cathode gas, and the coolant to flow in the stacking direction of the stack body 14.

At one end of the fuel cell 10 in the long side direction, as the fluid passages 36, one anode gas supply passage 38a, two cathode gas discharge passages 40b, and a coolant supply passage 42a are provided. The anode gas supply passage 38a is connected to the anode flow field 30 of the first separator 20a for allowing the anode gas to flow into the anode flow field 30. The two coolant supply passages 42a are connected to the coolant flow field 34 between the first and second separators 20a, 20b for allowing the coolant to flow into the coolant flow filed 34. The two cathode gas discharge passages 40b are connected to the cathode flow field 32 of the second separator 20b for allowing the cathode gas to flow out of the cathode flow field 32.

At the other end of the fuel cell 10 in the long side direction, as fluid passages 36, one cathode gas supply passage 40a, two anode gas discharge passages 38b, and two coolant discharge passages 42b are provided. The cathode gas supply passage 40a is connected to the cathode flow filed 32 of the second separator 20b for allowing the cathode gas to flow into the cathode flow field 32. The two coolant discharge passages 42b are connected to the coolant flow field 34 between the first and second separators 20a, 20b for allowing the coolant to flow out of the coolant flow field 34. The two anode gas discharge passages 38b are connected to the anode flow filed 30 of the first separator 20a for allowing the anode gas to flow out of the anode flow field 30. It should be noted that the positions, the number, and the shapes of the fluid passages 36 may be determined as necessary depending on the required specification.

Further, as shown in FIG. 1, at one end of the stack body 14 in the stacking direction, a terminal plate 44a, an insulator 46a, and an end plate 48a are stacked together. The insulator 46a is disposed outside the terminal plate 44a, and the end plate 48a is disposed outside the insulator 46a. At the other end of the stack body 14 in the stacking direction, a terminal plate 44b, an insulator 46b, and an end plate 48b are stacked together. The insulator 46b is disposed outside the terminal plate 44b, and the end plate 48b is disposed outside the insulator 46b. Each of the end plates 48a, 48b forms part of the stack case. Each of the above fluid passages 36 penetrates through one end (or both ends) of the stack body 14 in the stacking direction, and is connected to each pipe (not shown) attached to the outer surface of the end plate 48a.

Next, an aging apparatus 50 according to the embodiment of the present invention will be described. The aging apparatus 50 includes a placement unit 52 on which the fuel cell stack 12 is placed, a first distribution unit 60 and a second distribution unit 70 for distributing humidified gas to the fuel cell stack 12, and an electronic load apparatus 80 electrically connected to the fuel cell stack 12. Further, the aging apparatus 50 includes a control unit 54 for controlling operation of the aging apparatus 50 as a whole.

The placement unit 52 has space where the fuel cell stack 12 can be set, and has a plurality of pipes (not shown) connectable to the respective fluid passages 36 of the fuel cell stack 12 (end plate 48a) set in the space. Further, the aging apparatus 50 connects the pair of terminal plates 44a, 44b of the fuel cell stack 12 set on the placement unit 52, and the electronic load apparatus 80 through a pair of harnesses 56.

The electronic load apparatus 80 is used, in particular, when large electrical current flows between the anode and the cathode during power generation (power generation aging or power generation for characteristic evaluation).

The first distribution unit 60 has a first circulation channel 61 (as a passage of fluid) connected to a predetermined pipe of the placement unit 52. The first circulation channel 61 is made of a metal pipe or the like having an internal flow channel. The first circulation channel 61 is connected to the anode gas supply passage 38a and the anode gas discharge passage 38b of the fuel cell stack 12 set on the placement unit 52. That is, the first distribution unit 60 distributes the fluid to the anode 24 of the fuel cell 10 in the fuel cell stack 12, i.e., causing the fluid to flow through the anode.

Further, the first distribution unit 60 has a first humidified gas generation unit 62 for selectively distributing (flowing) two types of humidified gases to the first circulation channel 61. In the embodiment of the present invention, the two types of gases are $H_2$ gas (hydrogen gas) and $N_2$ gas (nitrogen gas: inert gas). Specifically, the first humidified gas generation unit 62 includes a bubbler tank 63 for humidifying the $H_2$ gas or $N_2$ gas, two types of gas sources ($H_2$ gas source 64, $N_2$ gas source 65) connected to the bubbler tank 63, and a water supply unit 66 for suppling water ($H_2O$) to the bubbler tank 63. That is, the first humidified gas generation unit 62 supplies one of gases of the two types of gas sources and the water to the bubbler tank 63, and generates a humidified gas by the bubbler tank 63.

When a stop valve (not shown) is opened under control of the control unit 54, the $H_2$ gas source 64 releases the $H_2$ gas to the bubbler tank 63, and when the stop valve is closed, release of the $H_2$ gas from the $H_2$ gas source 64 is interrupted. Likewise, when a stop valve (not shown) is opened under control of the control unit 54, the $N_2$ gas source 65 releases the $N_2$ gas to the bubbler tank 63, and when the stop valve is closed, release of the $N_2$ gas from the $N_2$ gas source 65 is interrupted. For example, the water supply unit 66 is connected to city water or tap water, and has a water processing unit for removing impurities, a tank, and a valve (both not shown). Under control of the control unit 54, the water supply unit 66 supplies water to the bubbler tank 63.

The bubbler tank 63 is provided at a position adjacent to a supply port 52a for suppling gas to the placement unit 52. $H_2$ gas or $N_2$ gas is supplied to the water stored in the bubbler tank 63 for thereby bubbling, and the humidified $H_2$ gas or $N_2$ gas is generated. The humidity of the humidified $H_2$ gas or the humidified $N_2$ gas is not limited specially. Preferably, the humidity is over-humidified state of not less than 70%. The bubbler tank 63 is configured to control the temperature and the humidity of the gas by adjusting the temperature in the tank by a temperature adjusting unit (not shown).

The first distribution unit 60 includes, in addition to the first humidified gas generation unit 62, a first valve 67 for opening/closing the passage of the first circulation channel 61, and a first pump 68 for circulating the fluid, in the first circulation channel 61. The first valve 67 is provided adjacent to a discharge port 52b for discharging the gas from the placement unit 52. The first valve 67 changes the opening degree under the control of the control unit 54 to adjust the internal pressure of the anode flow field 30 of the fuel cell stack 12 and the first circulation channel 61, and interrupts flow of fluid in the closed state. The first pump 68 controls the rotation speed by the control unit 54 to circulate the humidified gas at a suitable flow velocity.

Further, the first circulation channel 61 is provided with a plurality of sensors (not shown) for detecting information related to the circulation state of fluid. Each of the sensors is connected to the control unit 54 in a manner that the sensors can communicate information with the control unit 54. Examples of the plurality of sensors include a pressure sensor for detecting the pressure in the first circulation channel 61, a temperature sensor for detecting the temperature of the first circulation channel 61, and a concentration sensor for detecting the amount of gas.

Further, a first discharge channel 69 is connected to the downstream side of the first valve 67 of the first circulation channel 61. The first discharge channel 69 discharges the gas from the first circulation channel 61. The first discharge channel 69 includes a first discharge valve 69a which is opened/closed under control of the control unit 54. When the first discharge valve 69a is closed, the discharge of the gas from the first circulation channel 61 is interrupted, and when the first discharge valve 69a is opened, the gas is discharged from the first circulation channel 61.

On the other hand, the second distribution unit 70 includes a second circulation channel 71 (as a passage of fluid) connected to a predetermined pipe of the placement unit 52. The second circulation channel 71 is made of a metal pipe or the like having an internal flow channel. The second circulation channel 71 is connected to the cathode gas supply passage 40a and the cathode gas discharge passage 40b of the fuel cell stack 12 set in the placement unit 52. That is, the second distribution unit 70 allows the fluid to flow into the cathode 26 of the fuel cell 10 in the fuel cell stack 12.

As with the first circulation channel 61, the second circulation channel 71 is provided with: a second humidified gas generation unit 72 including a bubbler tank 73, an $H_2$ gas source 74, an $N_2$ gas source 75, and a water supply unit 76; a second valve 77; a second pump 78; and a plurality of sensors. Further, a second discharge channel 79 having a second discharge valve 79a is connected to the second circulation channel 71. The constituent elements of the second distribution unit 70 may be the same as those of the first distribution unit 60, and are operated under control of the control unit 54. Therefore, the specific description will be omitted.

Further, the electronic load apparatus 80 of the aging apparatus 50 is electrically connected to the pair of terminal plates 44a, 44b of the fuel cell stack 12 placed on the placement unit 52 through the harnesses 56, and connected to the control unit 54 in a manner that the electronic load apparatus 80 can communicate with the control unit 54. The resistance value (load) of the electronic load apparatus 80 is changed under the control of the control unit 54, whereby the electronic load apparatus 80 adjusts the electric power amount outputted from the anode 24 and the cathode 26 of each of the fuel cells 10.

Though not shown, the aging apparatus 50 may have a coolant circulation unit for circulating a coolant (water) to the coolant discharge passage 42b, the coolant supply passage 42a, and the coolant flow field 34 of the fuel cell stack 12 placed on the placement unit 52. The aging apparatus 50 can adjust the temperature of the fuel cell stack 12 by circulation of the coolant.

The control unit 54 of the aging apparatus 50 includes at least one processor, a memory, an input/output interface, and an electronic circuit (all not shown). A program (not shown) stored in the memory is executed by one or more processor to form a plurality of functions blocks in the control unit 54 for controlling constituent elements of the fuel cell system. It should be noted that at least some of the function blocks may include integrated circuits such as ASIC (Application Specific Integrated Circuit) and the FPGA (Field Programmable Gate Array) or electronic circuits including discrete devices. Further, the memory may be partially associated with a processor or an integrated circuit.

In the aging method of the fuel cell 10 according to the first embodiment, a principle of a concentration cell is utilized for flowing protons (H+) into the MEA 18 in humidified gas aging. In the concentration cell, $H_2$ is supplied to the fuel cell 10 to generate a concentration difference of hydrogen ($H_2$) between the anode 24 and the cathode 26 of the MEA 18 and then facilitate equilibrium of the concentration in the MEA 18, to thereby move protons.

Figure 3A:
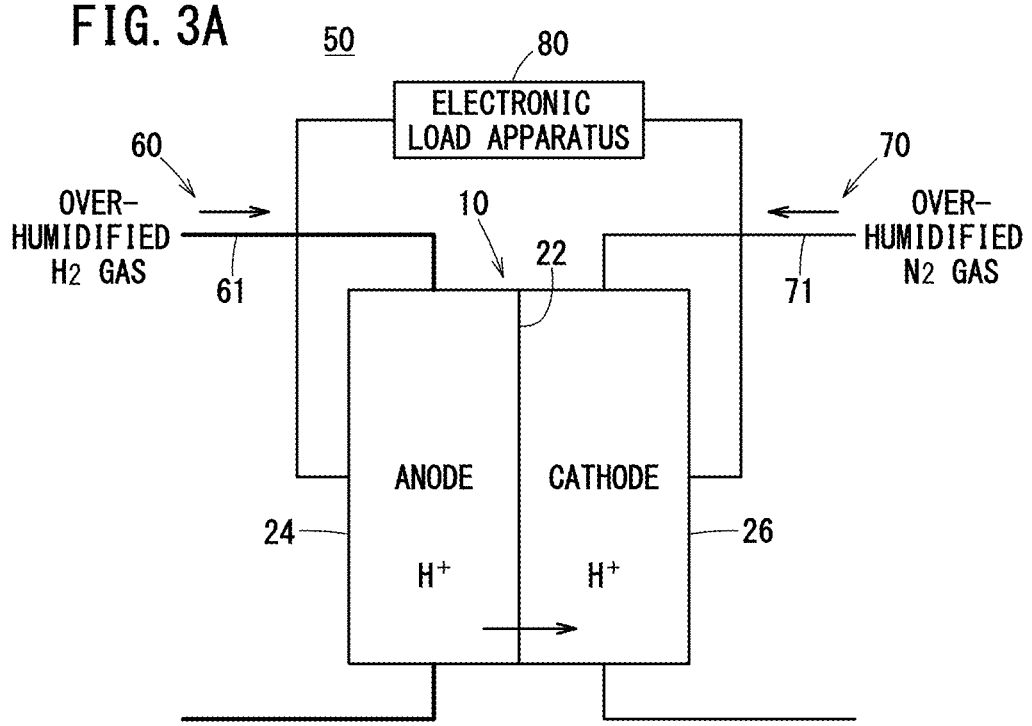
FIG. 3A is a diagram showing a first pattern of over-humidified gas aging (concentration cell)
Figure 3B:
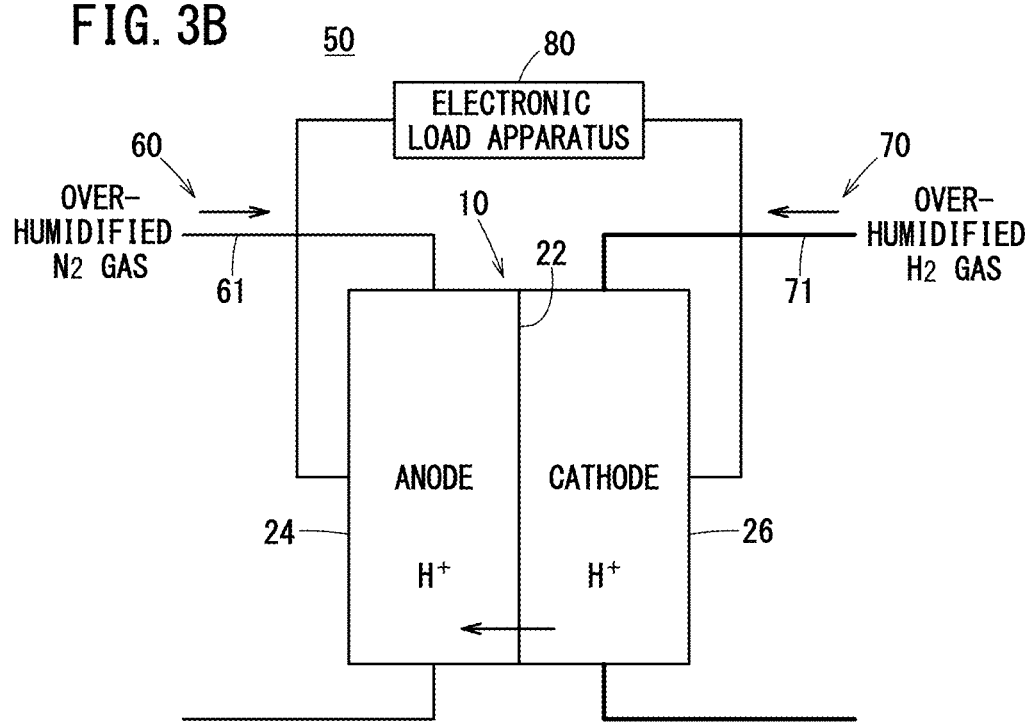
FIG. 3B is a diagram showing a second pattern of the over-humidified gas aging (concentration cell)

The control unit 54 controls operation of the first distribution unit 60 and the second distribution unit 70 to perform two patterns of over-humidified gas aging (concentration cell) as shown in FIGS. 3A and 3B. The first pattern is a supply pattern where the over-humidified $H_2$ gas is supplied to the anode 24, and the over-humidified $N_2$ gas is supplied to the cathode 26. The second pattern is a reverse supply pattern where the over-humidified $N_2$ gas is supplied to the anode 24 and the over-humidified $H_2$ gas is supplied to the cathode 26.

The control unit 54 may perform each of the first pattern and the second pattern of over-humidified gas aging (concentration cell) once successively, (e.g., perform the first pattern and then the second pattern, or perform the second pattern and then the first pattern). Alternatively, the control unit 54 may perform the first pattern and the second pattern multiple times at predetermined time intervals. Hereinafter, operation of the fuel cell 10 when the over-humidified gas is supplied in the first pattern and the second pattern will be described.

In the first pattern, as shown in FIG. 4, the aging apparatus 50 supplies the over-humidified $H_2$ gas to the anode flow field 30 and the anode 24 by the first distribution unit 60, and supplies the over-humidified $N_2$ gas to the cathode flow field 32 and the cathode 26 by the second distribution unit 70. Therefore, in the MEA 18, $H_2$ concentration is high on the anode 24 side, and $H_2$ concentration is low on the cathode 26 side. Therefore, in the MEA 18, flow of protons moving from the anode 24 to the cathode 26 through the electrolyte membrane 22 is generated in a manner that the concentration difference of $H_2$ reaches equilibrium.

$H_2$ and $H_2O$ in the gas state supplied to the anode flow field 30 easily pass through the gas diffusion layer 24c and the dense carbon layer 24b, and diffuse to the catalyst layer 24a. Then, $H_2$ that has moved to the catalyst layer 24a reacts with platinum catalyst, and is ionized into protons (H+) and electrons (e−). The ionized protons are accompanied with electro osmosis water, and move from the anode to the cathode inside the MEA 18. On the other hand, electrons move to the first separator 20a which contacts the anode 24, and further move to the second separator 20b through the harnesses 56 and the electronic load apparatus 80.

In contrast, $N_2$ and $H_2O$ in the gas state supplied to the cathode 26 are distributed to the gas diffusion layer 26c, the dense carbon layer 26b, and the catalyst layer 26a. The $N_2$ gas does not react with the platinum catalyst. Therefore, unnecessary reactions at the catalyst layer 26a (reactions of oxygen, protons, electrons) are suppressed. Thus, the protons that have moved through the MEA 18 and the electrons of the cathode 26 react with the platinum catalyst of the catalyst layer 26a to produce $H_2$. $H_2$ produced at the cathode 26 is discharged from the fuel cell 10 together with $N_2$ and $H_2O$.

Further, in the aging apparatus 50, at the time of performing the first pattern, control may be performed in which the pressure on the anode 24 side becomes higher than the pressure on the cathode 26 side. Specifically, the control unit 54 reduces the opening degree of the first valve 67 to become smaller than the opening degree of the second valve 77, and increase the rotation speed of the first pump 68 to become larger than the rotation speed of the second pump 78. In this manner, the aging apparatus 50 can increase the pressure in the first circulation channel 61 and the fuel cell stack 12 (anode flow field 30) to become higher than the pressure in the second circulation channel 71 and the fuel cell stack 12 (cathode flow field 32).

For example, the aging apparatus 50 causes the pressure on the anode 24 side to be about 50 kPa to 150 kPa higher than the pressure on the cathode 26 (i.e., the differential pressure is about 50 kPa to 150 kPa). As described above, since the pressure on the electrode side (the anode side in this case) where the over-humidified $H_2$ gas is supplied is high, $H_2$ and $H_2O$ supplied to the anode 24 can move more easily to the catalyst layer 24a. Accordingly, it becomes possible to efficiently generate protons at the catalyst layer 24a.

On the other hand, in the second pattern, as shown in FIG. 5, the aging apparatus 50 supplies the over-humidified $N_2$ gas to the anode flow field 30 and the anode 24 by the first distribution unit 60, and supplies the over-humidified $H_2$ gas to the cathode flow field 32 and the cathode 26 by the second distribution unit 70. Accordingly, in the MEA 18, flow of protons to move from the cathode 26 to the anode 24 through the electrolyte membrane 22 is generated in a manner that the concentration difference of $H_2$ reaches equilibrium.

$H_2$ and $H_2O$ in the gas state supplied to the cathode flow field 32 pass through the gas diffusion layer 26c and the dense carbon layer 26b easily, and diffuse to the catalyst layer 26a. Then, $H_2$ that has moved to the catalyst layer 26a reacts with the platinum catalyst, and is ionized into protons (H+) and electrons (e−). The ionized protons are accompanied with electro osmosis water, and move from the cathode to the anode inside the MEA 18. On the other hand, electrons move to the second separator 20b which is in contact with the cathode 26, and move to the first separator 20a through the harnesses 56 and the electronic load apparatus 80.

Therefore, at the anode 24, the protons that have moved through the MEA 18 and the electrons of the anode 24 react with the platinum catalyst of the catalyst layer 24a to produce $H_2$. $H_2$ produced at the anode 24 is discharged from the fuel cell 10 together with $N_2$ and $H_2O$.

Further, in the aging apparatus 50, at the time of performing the second pattern, control may be performed in which the pressure on the cathode 26 side becomes higher than the pressure on the anode 24 side. That is, the control unit 54 causes the opening degree of the second valve 77 to become smaller than the opening degree of the first valve 67, and increase the rotation speed of the second pump 78 to become greater than the rotation speed of the first pump 68. Accordingly, the pressure on the cathode 26 side relative to the pressure on the anode 24 side (i.e., the differential pressure) is sufficiently high, the aging apparatus 50 can efficiently produce protons in the catalyst layer 26a of the cathode 26.

It should be noted that, in the case of control where the differential pressure is generated between the pair of electrodes, preferably, the control unit 54 performs a conditioning step for suppressing the overload on the electrolyte membrane 22 at the time of switching between the first pattern and the second pattern. In this conditioning step, in order to reduce (or eliminate) the differential pressure between the pair of electrodes, purge control is performed to discharge the over-humidified $H_2$ gas from the circulation channel on the high-pressure side, i.e., the side where the over-humidified $H_2$ has been supplied. For example, in the purge control, the control unit 54 fully opens the valve (the first valve 67 or the second valve 77) on the side the over-humidified $H_2$ gas has been supplied, and opens the discharge valve (the first discharge valve 69a or the second discharge valve 79a) on the same side to discharge the over-humidified $H_2$ gas.

Further, $H_2$ or protons remain in the electrode to which the over-humidified $H_2$ gas has been supplied. Therefore, as the conditioning step, it is preferable to perform $N_2$ supply control of supplying $N_2$ gas to the electrode to which $H_2$ and $H_2O$ in the gas state have been supplied.

For example, in the conditioning step, the control unit 54 performs the purge control and the $N_2$ supply control in combination. In this manner, it is possible to eliminate the differential pressure and remove the remaining hydrogen from the electrode efficiently.

The aging apparatus 50 according to the embodiment of the present invention basically has the above structure. Hereinafter, the method of aging the fuel cell 10 will be described with reference to FIG. 6A. Specifically, in the method of aging the fuel cell 10, over-humidified gas aging (step S1), $N_2$ purge (step S2), CV aging (step S3), and performance evaluation (step S4) are performed successively.

The over-humidified gas aging in step S1 mainly increases humidification of the electrolyte membrane 22 to facilitate movement of protons. The aging apparatus 50 as described above is used in this over-humidified gas aging. For example, in the over-humidified gas aging, the aging apparatus 50 performs the first pattern and the second pattern as described above alternately.

In performing the first pattern (step S1-1 in FIG. 6B), as shown in FIG. 1, the control unit 54 controls the first humidified gas generation unit 62 to supply $H_2$ from the $H_2$ gas source 64 to thereby generate the over-humidified $H_2$ gas in the bubbler tank 63, and also controls the second humidified gas generation unit 72 to supply $N_2$ from the $N_2$ gas source 75 to thereby generate the over-humidified $N_2$ gas in the bubbler tank 73.

Then, the control unit 54 operates the first pump 68 to supply the over-humidified $H_2$ gas from the bubbler tank 63 to the fuel cell stack 12, and operates the second pump 78 to supply the over-humidified $N_2$ gas from the bubbler tank 73 to the fuel cell stack 12. At this time, the control unit 54 causes the rotation speed of the first pump 68 to become higher than the rotation speed of the second pump 78 and causes the opening degree of the first valve 67 to become smaller than the opening degree of the second valve 77. Accordingly, the pressure on the anode 24 side where the over-humidified $H_2$ gas is supplied becomes higher than the pressure on the cathode 26 side where the over-humidified $N_2$ gas is supplied. As a result, $H_2$ and $H_2O$ move smoothly to the catalyst layer 24a of the anode 24. Further, in the state where the pressure on the anode 24 side is increased, the control unit 54 may stop the first pump 68 and close the first valve 67 to stop circulation of the over-humidified $H_2$ gas. By this stopping, it is possible to reliably retain the high-pressure $H_2$ and $H_2O$ in the anode 24.

By the above control, as shown in FIG. 4, in the catalyst layer 24a of the anode 24, $H_2$ reacts with the platinum catalyst, and is ionized into protons and electrons. The ionized protons are accompanied with electro osmosis water, and move through the electrolyte membrane 22 to the cathode 26. In the catalyst layer 26a of the cathode 26, the protons that have moved through the electrolyte membrane 22 and the electrons that have moved through the electronic load apparatus 80 react with the platinum catalyst to produce $H_2$.

Figure 6B:
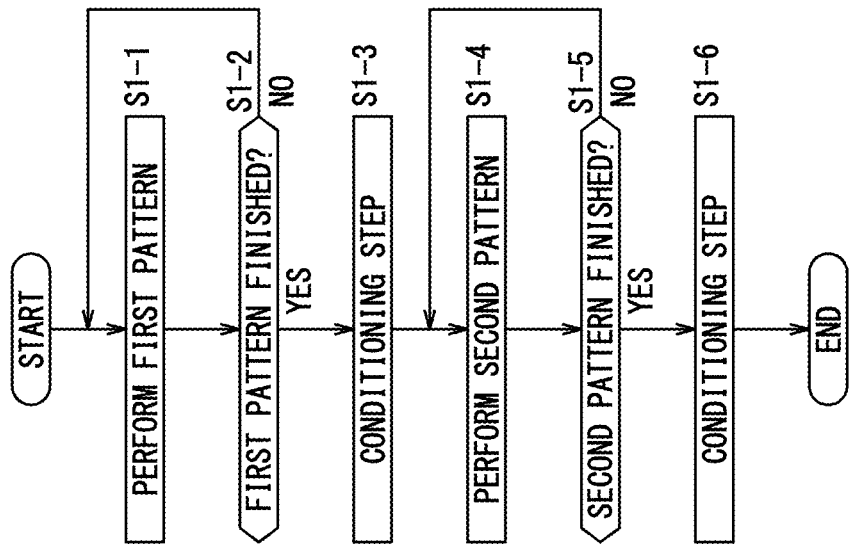
FIG. 6B is a flow chart showing a process flow of over-humidified gas aging.

Next, the control unit 54 determines whether or not the first pattern has been performed for a predetermined time (step S1-2 in FIG. 6B). In the case where the first pattern has not yet been performed for the predetermined time (step S1-2: NO), the first pattern is continued. In the case where the first pattern has been performed for the predetermined time (step S1-2: YES), the routine proceeds to the conditioning step (step S1-3). In the conditioning step, the control unit 54 fully opens the first valve 67, and opens the first discharge valve 69a of the first discharge channel 69 to discharge $H_2$ and $H_2O$ from the anode 24 side. In contrast, purge control to maintain circulation of the second circulation channel 71 (or stop of circulation by closing of the second valve 77) is performed by not opening the second discharge valve 79a on the cathode 26 side. Therefore, the pressure of the over-humidified $H_2$ gas on the anode 24 side is decreased, and the differential pressure between the anode 24 and the cathode 26 becomes small.

Further, the control unit 54 discharges $H_2$ and $H_2O$ from the first circulation channel 61, and operates the first humidified gas generation unit 62 and the first pump 68 to perform $N_2$ supply control of supplying the over-humidified $N_2$ gas to the anode 24 side. By supplying the over-humidified $N_2$ gas, humidification of the electrolyte membrane 22 and the catalyst layer 24a is maintained, and $H_2$ remaining at the anode 24 is discharged. Then, after the control unit 54 has performed the above conditioning step for a set time (or after the control unit 54 has performed the conditioning step until the differential pressure between the anode 24 and the cathode 26 becomes not more than the predetermined pressure), the conditioning step is finished.

Thereafter, the control unit 54 performs the second pattern (step S1-4 in FIG. 6B). In performing the second pattern, as shown in FIG. 1, the control unit 54 controls the first humidified gas generation unit 62 to supply $N_2$ from the $N_2$ gas source 65 to thereby generate the over-humidified $N_2$ gas in the bubbler tank 63, and controls the second humidified gas generation unit 72 to supply $H_2$ from the $H_2$ gas source 74 to thereby generate the over-humidified $H_2$ gas in the bubbler tank 73. Then, the aging apparatus 50 supplies the over-humidified $N_2$ gas to the anode 24, and supplies the over humidified $H_2$ gas to the cathode 26. At this time, the control unit 54 causes the pressure of the cathode 26 side where the over-humidified $H_2$ gas is supplied to become higher than the pressure on the anode 24 side where the over-humidified $N_2$ gas is supplied. Further, in the state where the pressure on the cathode 26 side is increased, the control unit 54 may stop the second pump 78 and close the second valve 77 to stop circulation of the over-humidified $H_2$ gas. By this stopping, it is possible to reliably retain the high-pressure $H_2$ and $H_2O$ in the cathode 26.

By the above control, as shown in FIG. 5, at the cathode 26, protons ionized from $H_2$ at the platinum catalyst are accompanied with electro osmosis water, and move through the electrolyte membrane 22. Then, at the anode 24, the protons that have moved through the electrolyte membrane 22 and the electrons that have moved through the electronic load apparatus 80 react with the platinum catalyst to produce $H_2$.

Next, the control unit 54 determines whether or not the second pattern has been performed for a predetermined time (step S1-5). In the case where the second pattern has not yet been performed for the predetermined time (step S1-5: NO), the second pattern is continued. In the case where the second pattern has been performed for the predetermined time (step S1-5: YES), the conditioning step is performed (step S1-6). In this conditioning step, control which performs the reverse operation of the conditioning step in step S1-3 is performed.

That is, the control unit 54 discharges $H_2$ and $H_2O$ on the cathode 26 side to thereby decrease the pressure on the cathode 26 side and reduce the differential pressure between the cathode 26 side and the anode 24 side. Further, the control unit 54 discharges the over-humidified $H_2$ gas from the second circulation channel 71, and supplies the over-humidified $N_2$ gas to the cathode 26 side. By supply of the over-humidified $N_2$ gas, humidification of the electrolyte membrane 22 and the catalyst layer 26a is maintained, and $H_2$ remaining at the cathode 26 is discharged. Then, after the control unit 54 has performed the above conditioning step for a set time (or after the control unit 54 has performed the conditioning step until the differential pressure between the anode 24 and the cathode 26 becomes not more than the predetermined pressure), the conditioning step is finished.

The aging apparatus 50 continues the above process flow a predetermined repeat number of times or for a predetermined period of time, and then finishes the over-humidified gas aging. In the above over-humidified gas aging (concentration cell), by performing the first pattern and the second pattern, it is possible to achieve improvement in the mobility (diffusion ability) of $H_2$ in the anode 24 and the cathode 26, and wettability of the electrolyte membrane 22.

In this regard, in the conventional aging method, $H_2$ and $H_2O$ are supplied continuously to one of the pair of electrodes (e.g., the anode 24), and $N_2$ and $H_2O$ are supplied continuously to the other of the pair of electrodes (e.g., the cathode 26). In this case, as shown in FIG. 7B, in the electrolyte membrane 22, protons and the electro osmosis water move only from one side to the other side all the time, so that the water content state (water content amount) at the central part of the electrolyte membrane 22 is increased, but the water content of the marginal portion (the other side) opposite to the one side tends to be kept low. Therefore, in the conventional aging method, it is necessary to perform aging for a long time, and for this reason, there are problems such as decrease of efficiency and increase of the cost.

Figure 7A:
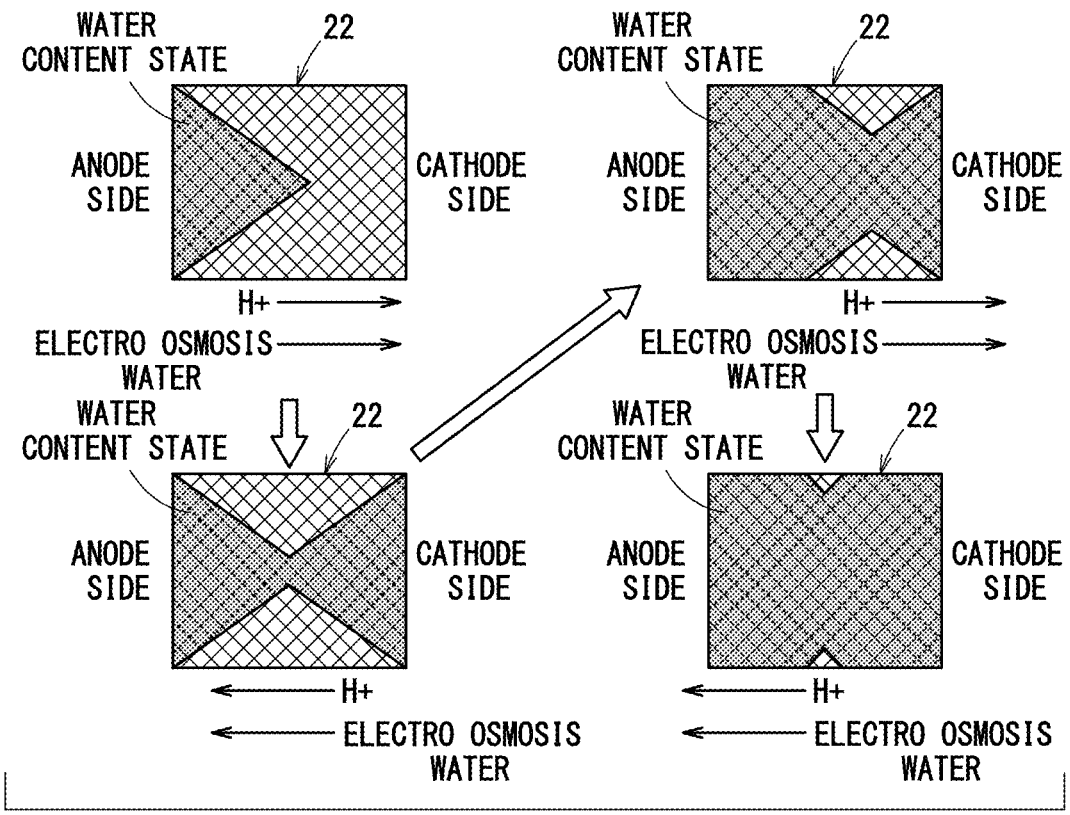
FIG. 7A is a view schematically showing a humidified state of an electrolyte membrane humidified by over-humidified gas aging of the present invention.
Figure 7B:
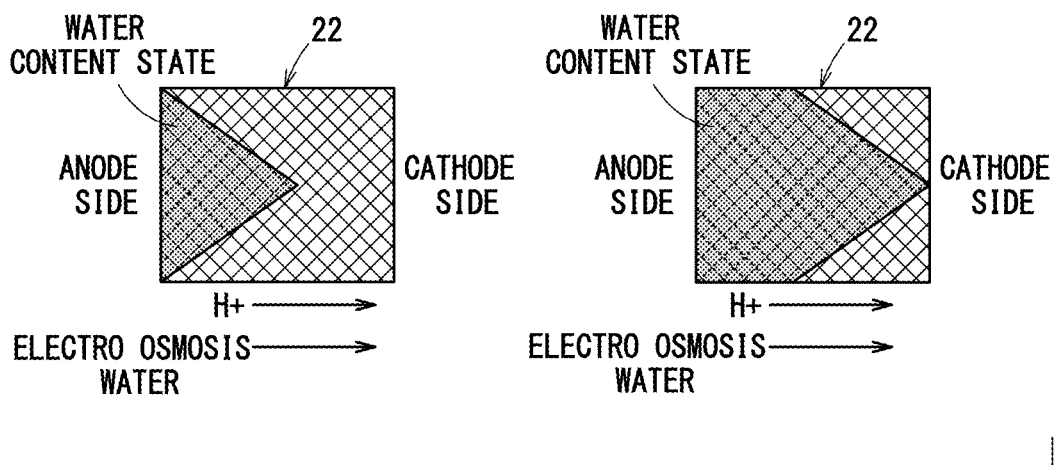
FIG. 7B is a view schematically showing a humidified state of an electrolyte membrane humidified by conventional aging.

In contrast, in the aging method according to the embodiment of the present invention, as shown in FIG. 7A, by the first pattern where $H_2$ and $H_2O$ are supplied to the anode 24 and $N_2$ and $H_2O$ are supplied to the cathode 26, protons and electro osmosis water move from the anode 24 side. Further, by the second pattern where $N_2$ and $H_2O$ are supplied to the anode 24 while $H_2$ and $H_2O$ are supplied to the cathode 26, protons and electro osmosis water move from the cathode 26 side. Therefore, in the electrolyte membrane 22, the water content is increased from both of the anode 24 and the cathode 26. In particular, the marginal portion of the electrolyte membrane 22 receives electro osmosis water from the one side and the other side to thereby increase the water content amount efficiently. As a result, in the aging method of the embodiment of the present invention, it becomes possible to reduce the time of aging, and achieve cost reduction.

Figure 6A:
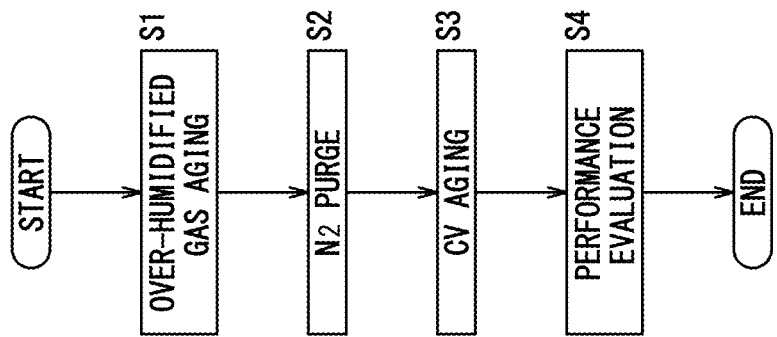
FIG. 6A is a flow chart showing the method of aging the fuel cell, according to a first embodiment.

In the method of aging the fuel cell 10, after the completion of the over-humidified gas aging, the next $N_2$ purge is performed (step S2 in FIG. 6A). The process of this $N_2$ purge may use the aging apparatus 50 used in the over-humidified gas aging, or alternatively, another apparatus may be used. The $N_2$ purge is a process of discharging (purging) the water, hydrogen, etc. remaining in the fuel cell stack 12 by supplying $N_2$ gas, which is an inert gas, to the anode flow field 30 and the cathode flow field 32 of the fuel cell stack 12 after the over-humidified gas aging. For example, in the case where the same aging apparatus 50 is used, the over-humidified $N_2$ gas is supplied from the $N_2$ gas source 65 of the first humidified gas generation unit 62 to the first circulation channel 61 through the bubbler tank 63, and the over-humidified $N_2$ gas is supplied to the second circulation channel 71 from the $N_2$ gas source 75 of the second humidified gas generation unit 72 through the bubbler tank 73. Therefore, in the fuel cell stack 12, humidification adjustment of the electrolyte membrane 22 is made, and flooding at the anode 24 and the cathode 26 is prevented. It is a matter of course that inert gases other than $N_2$ gas may be used in the $N_2$ purge. Further, in the $N_2$ purge, the aging apparatus 50 may supply a non-humidified $N_2$ gas.

Next, CV aging (voltage variation aging) in step S3 uses a CV aging apparatus (not shown) to apply variable voltage to the fuel cell stack 12 after the $N_2$ purge. By this CV aging, oxidized coating on the surface of the catalyst, and organic contamination attached to the catalyst are removed. Thus, the catalyst effective area of the MEA 18 is increased. As a result, the reaction $H_2 \rightarrow 2H^+ + e^-$ and the reaction $O_2 + 4H^+ + 4e^- \rightarrow 2H_2O$ in the power generation are facilitated. Further, since the over-humidified gas aging is performed beforehand, in the CV aging, the protons move easily in the electrolyte membrane 22. Therefore, it is possible to shorten the time for performing the CV aging.

Finally, in the performance evaluation in step S4, by a suitable evaluation method, the power generation performance of the fuel cell stack 12 (fuel cell 10) after the CV aging is analyzed. For example, in the evaluation method, by performing the power generation process of the fuel cell stack 12, the cell voltage and the electrical current during power generation are detected. In this regard, in the fuel cell stack 12 subjected to the over-humidified gas aging and the CV aging, the concentration overpotential of the IV curve is reduced, and the activation overpotential is reduced. Therefore, significant improvement in the power generation performance of the fuel cell stack 12 is achieved.

For example, the aging apparatus 50 is not limited to the apparatus which performs over-humidified gas aging on the fuel cell stack 12 having the plurality of fuel cells 10. The aging apparatus 50 may be configured to perform the over-humidified gas aging on the fuel cells 10 as unit power generation cells, by adding suitable modification to the above embodiment. Further, for example, in the method of aging the fuel cell 10, in the case where the power generation performance of the fuel cell 10 is improved sufficiently by performing the over-humidified gas aging, CV aging (step S3) may be omitted.

Figure 8:
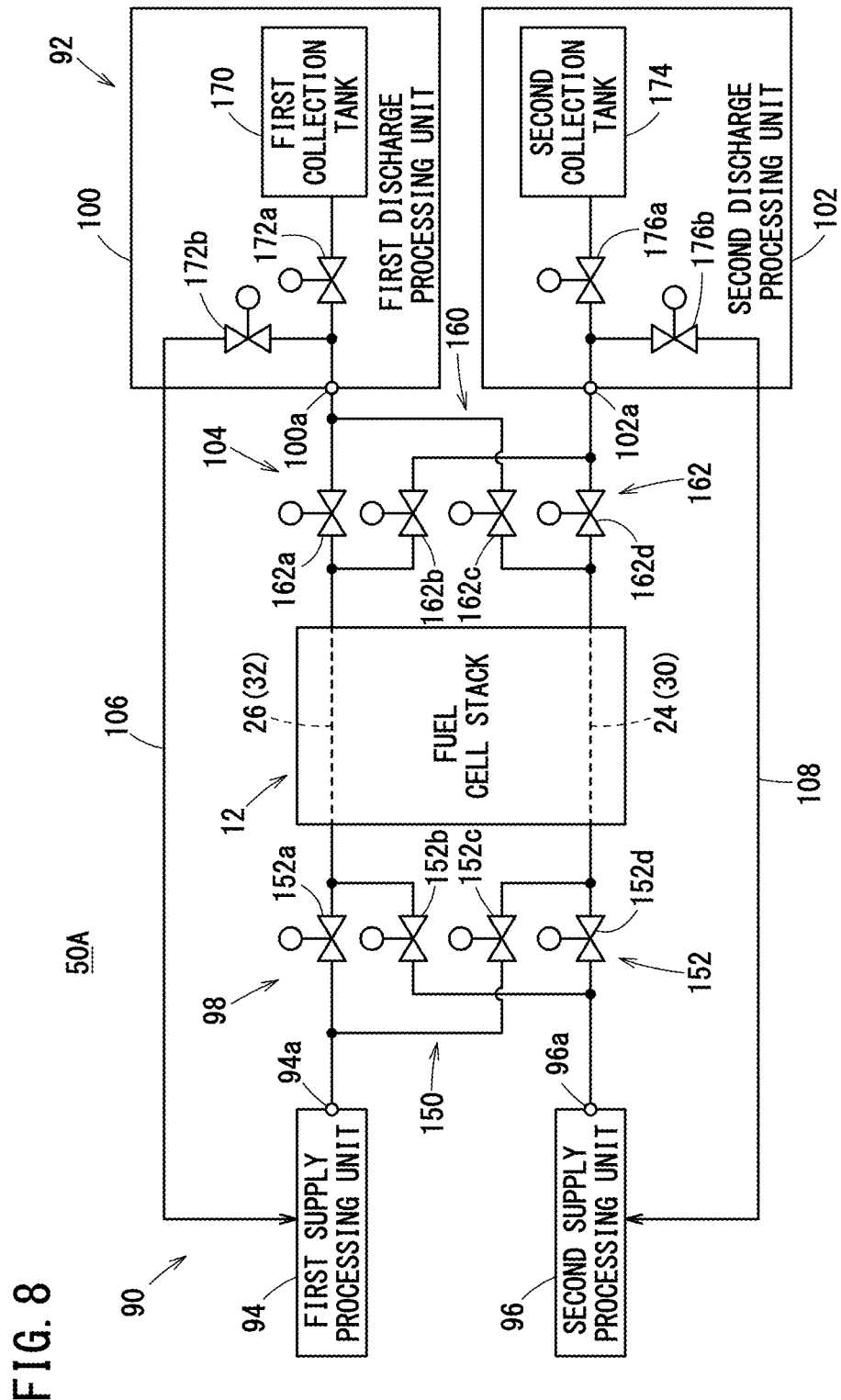
FIG. 8 is a partial diagram showing an aging apparatus according to a modified embodiment.

Further, in the above aging apparatus 50, each of the first humidified gas generation unit 62 and the second humidified gas generation unit 72 includes the $H_2$ gas source 64, 74 and the $N_2$ gas source 65, 75. However, the present invention is not limited in this respect. The aging apparatus 50 may have a structure where the gas sources for supplying the gases to the anode 24 and the cathode 26 are shared. Hereinafter, an aging apparatus 50A according to a modified embodiment having a shared gas source will be described with reference to FIGS. 8, 9A, and 9B.

The aging apparatus 50A includes a supply processing unit 90 for supplying a humidified $H_2$ gas, a humidified $N_2$ gas, and a humidified $O_2$ gas to the anode flow field 30, the cathode flow field 32, and the coolant flow field 34 of the fuel cell stack 12, and a discharge processing unit 92 for discharging the gases from the fuel cell stack 12. The supply processing unit 90 includes a first supply processing unit 94 for supplying $O_2$ (air in this modified embodiment) and $N_2$, a second supply processing unit 96 for supplying $H_2$, and a supply channel switching unit 98 for switching channels of fluid between the fuel cell stack 12, the first supply processing unit 94, and the second supply processing unit 96. The discharge processing unit 92 includes a first discharge processing unit 100 for processing the discharge of $O_2$ and $N_2$, a second discharge processing unit 102 for processing the discharge of $H_2$, and a discharge channel switching unit 104 for switching channels of the fluid between the fuel cell stack 12, the first discharge processing unit 100, and the second discharge processing unit 102. A first circulation channel 106 is connected between the first supply processing unit 94 and the first discharge processing unit 100 for circulating fluid of the first discharge processing unit 100.

Further, a second circulation channel 108 is connected between the second supply processing unit 96 and the second discharge processing unit 102 for circulating fluid of the second discharge processing unit 102.

Figure 9A:
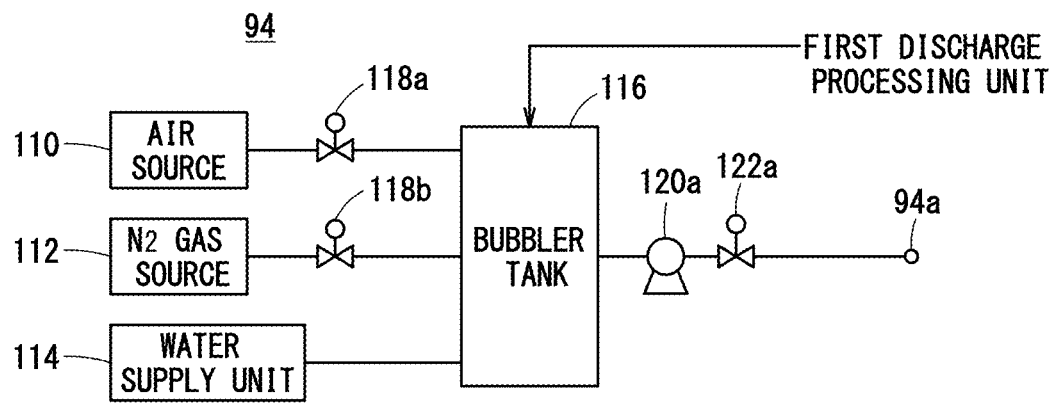
FIG. 9A is a diagram showing the structure of a first supply processing unit of the aging apparatus according to the modified embodiment.

As shown in FIG. 9A, the first supply processing unit 94 includes an air source 110, a $N_2$ gas source 112, a water supply unit 114, and a bubbler tank 116. A valve 118a is provided between the air source 110 and the bubbler tank 116 for switching between the supply of, and the stop of supply of the air. A valve 118b is provided between the $N_2$ gas source 112 and the bubbler tank 116 for switching between the supply of, and the stop of supply of the $N_2$ gas.

The bubbler tank 116 is connected to the air source 110, the $N_2$ gas source 112, and the water supply unit 114. The air or the $N_2$ gas is supplied to the water stored in the bubbler tank 116 for thereby bubbling, whereby the humidified $O_2$ gas or $N_2$ gas is generated. Further, the bubbler tank 116 adjusts the temperature by the temperature adjusting unit (not shown) to control the temperature and humidity of the gases. The first circulation channel 106 is connected to the bubbler tank 116, and circulates the over-humidified $O_2$ gas or the over-humidified $N_2$ gas of the first discharge processing unit 100 into the bubbler tank 116.

The first supply processing unit 94 has a pump 120a and a valve 122a between the bubbler tank 116 and an output terminal 94a of the first supply processing unit 94. The first supply processing unit 94 having the above structure can output the over-humidified $O_2$ gas or the over-humidified $N_2$ gas from the output terminal 94a to the supply channel switching unit 98 on the downstream side.

Figure 9B:
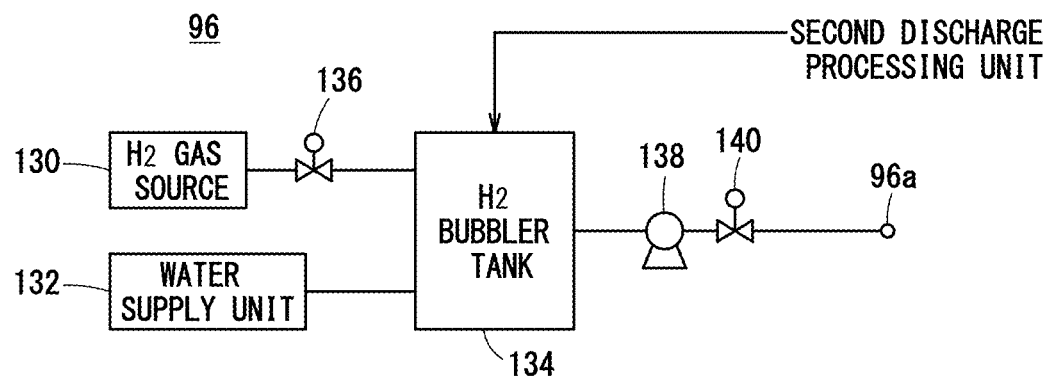
FIG. 9B is a diagram showing the structure of a second supply processing unit of the aging apparatus according to the modified embodiment.

On the other hand, as shown in FIG. 9B, the second supply processing unit 96 includes an $H_2$ gas source 130, a water supply unit 132, and an $H_2$ bubbler tank 134. A valve 136 is provided between the $H_2$ gas source 130 and the $H_2$ bubbler tank 134 for switching between the supply of, and the stop of supply of the $H_2$ gas.

$H_2$ gas is supplied to the water stored in the $H_2$ bubbler tank 134 for thereby bubbling, whereby the humidified $H_2$ gas is generated. Further, the $H_2$ bubbler tank 134 adjusts the temperature by a temperature adjusting unit (not shown) to control the temperature and the humidity of the gases. The second circulation channel 108 is connected to this $H_2$ bubbler tank 134, and circulates the over-humidified $H_2$ gas of the second discharge processing unit 102 into the $H_2$ bubbler tank 134.

The second supply processing unit 96 includes a pump 138 and a valve 140 between the $H_2$ bubbler tank 134 and an output terminal 96a of the second supply processing unit 96. The second supply processing unit 96 having the above structure can output the over-humidified $H_2$ gas from the output terminal 96a to the supply channel switching unit 98 on the downstream side.

Referring back to FIG. 8, the supply channel switching unit 98 includes a plurality of pipes 150 between the first supply processing unit 94 and the fuel cell stack 12, and between the second supply processing unit 96 and the fuel cell stack 12. Further, the plurality of pipes 150 are provided with a plurality of valves 152 (valves 152a, 152b, 152c, 152d), respectively. Under the switching operation of the valves 152, the supply channel switching unit 98 having the above structure supplies the fluid of the first supply processing unit 94 to one of the anode 24 and the cathode 26, and supplies the fluid of the second supply processing unit 96 to the other of the anode 24 and the cathode 26.

Likewise, the discharge channel switching unit 104 includes a plurality of pipes 160 between the first discharge processing unit 100 and the fuel cell stack 12, and between the second discharge processing unit 102 and the fuel cell stack 12. Further, the plurality of pipes 160 are provided with a plurality of valves 162 (valves 162a, 162b, 162c, 162d), respectively. Under the switching operation of the valves 162, the discharge channel switching unit 104 having the above structure discharges the fluid from one of the anode 24 and the cathode 26 to the first discharge processing unit 100, and discharges the fluid from the other of the anode 24 and the cathode 26 to the second discharge processing unit 102.

The first discharge processing unit 100 has a first collection tank 170 for collecting the over-humidified $N_2$ gas and the over-humidified $O_2$ gas. Further, the first circulation channel 106 is connected between an input terminal 100a of the first discharge processing unit 100 and the first collection tank 170. A valve 172a is provided between the input terminal 100a and the first collection tank 170, and a valve 172b is provided also in the first circulation channel 106. Under switching operation of the valves 172a, 172b, the first discharge processing unit 100 having the above structure can discharge the over-humidified $N_2$ gas and the over-humidified $O_2$ gas to the first collection tank 170, and cause the over-humidified $N_2$ gas and the over-humidified $O_2$ gas to flow through the first circulation channel 106.

Likewise, the second discharge processing unit 102 has a second collection tank 174 for collecting the over-humidified $H_2$ gas. Further, the second circulation channel 108 is connected between an input terminal 102a of the second discharge processing unit 102 and the second collection tank 174. A valve 176a is provided between the input terminal 102a and the second collection tank 174, and a valve 176b is provided also in the second circulation channel 108. Under the switching operation of the valves 176a, 176b, the second discharge processing unit 102 having the above structure can discharge the over-humidified $H_2$ gas to the second collection tank 174, and cause the over-humidified $H_2$ gas to flow through the second circulation channel 108.

In performing the first pattern, as shown in FIG. 10A, the control unit 54 (see FIG. 1) of the aging apparatus 50A opens the valves 152a, 152d, 162a, 162d, and closes the valves 152b, 152c, 162b, 162c. In this manner, the aging apparatus 50A can supply the over-humidified $H_2$ gas to the anode 24 and supplies the over-humidified $N_2$ gas to the cathode 26.

Further, in the conditioning step after performing the first pattern, as shown in FIG. 10B, the control unit 54 opens the valves 152c, 162c, and closes the valves 152a, 152b, 152d, 162a, 162b, 162d. As a result, the aging apparatus 50A can perform the purge control where the over-humidified $H_2$ gas is discharged from the anode 24 to decrease the internal pressure, and can perform the $N_2$ supply control where the over-humidified $N_2$ gas is supplied to the anode 24 to discharge the remaining hydrogen.

Further, as shown in FIG. 11A, in performing the second pattern, the control unit 54 opens the valves 152b, 152c, 162b, 162c, and closes the valves 152a, 152d, 162a, 162d. In this manner, the aging apparatus 50A can supply the over-humidified $N_2$ gas to the anode 24 and supply the over-humidified $H_2$ gas to the cathode 26.

Further, in the conditioning step after performing the second pattern, as shown in FIG. 11B, the control unit 54 opens the valves 152a, 162a, and closes the valves 152b, 152c, 152d, 162b, 162c, 162d. In this manner, the aging apparatus 50A can perform the purge control where the over-humidified $H_2$ gas is discharged from the cathode 26 to decrease the internal pressure, and can perform the $N_2$ supply control where the over-humidified $N_2$ gas is supplied to the cathode 26 to discharge the remaining hydrogen.

Further, the aging apparatus 50A can supply the over-humidified $H_2$ gas to the anode 24, and the over-humidified $O_2$ gas to the cathode 26 to thereby perform power generation of the fuel cell stack 12. Alternatively, in aging, the aging apparatus 50A can supply the over-humidified $O_2$ gas to the anode 24, and supply the over-humidified $H_2$ gas to the cathode 26 to thereby perform power generation of the fuel cell stack 12. Power generation of the fuel cell stack 12 may be performed by combining the first pattern and the second pattern, or may be performed after the over-humidified gas aging.

Second Embodiment

The method of aging the fuel cell 10 according to the second embodiment utilizes the principle of a hydrogen pump, in order for protons (H+) to move in the MEA 18 in the over-humidified gas aging. In the hydrogen pump, the flow of electrons is formed by a direct current (DC) power source connected to the fuel cell 10, to thereby move protons in a direction toward a side where a large number of electrons are present in the MEA 18. That is, the over-humidified gas aging according to the second embodiment is a method of moving (pumping) the protons by electrical current.

Therefore, an aging apparatus 50B according the second embodiment has a potential application unit 82 connected to the fuel cell stack 12, in addition to the electronic load apparatus 80. In the over-humidified gas aging (hydrogen pump), the control unit 54 of the aging apparatus 50B controls operation of the potential application unit 82, in addition to controlling the first distribution unit 60 and the second distribution unit 70, to thereby perform two patterns as shown in FIGS. 12A and 12B.

The voltage value the potential application unit 82 outputs to the fuel cell stack 12 may have a suitable value in correspondence with the number of stacked fuel cells 10. For example, the voltage per unit fuel cell (one cell) is set in the range of several mV to about 1 V.

Figure 12A:
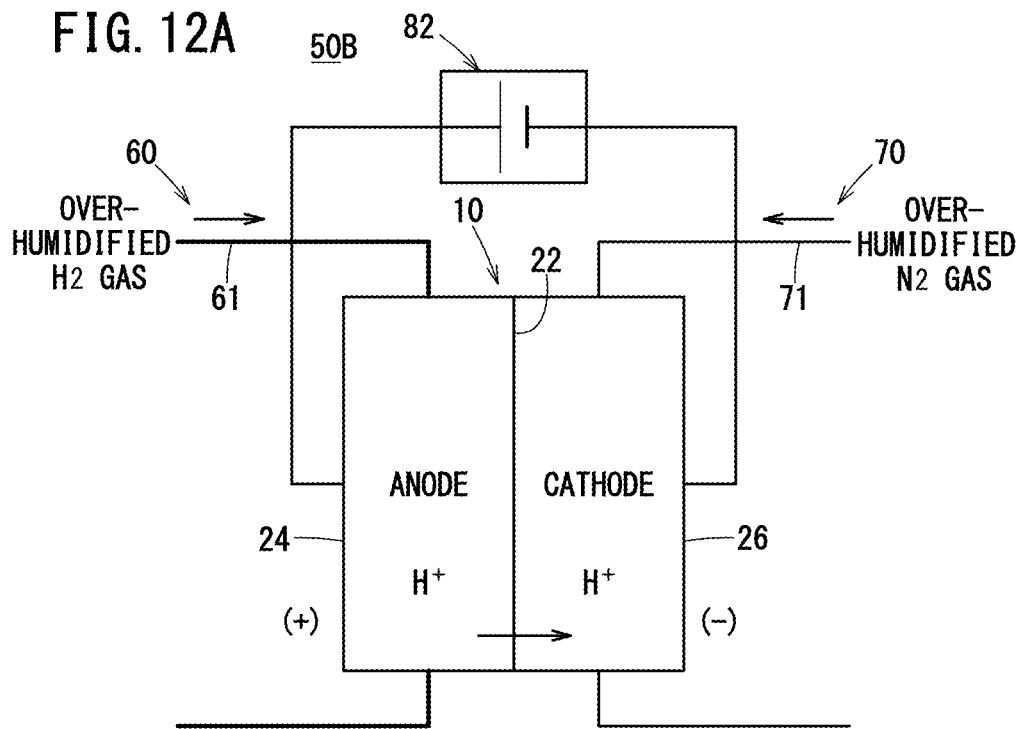
FIG. 12A is a diagram showing a first pattern of a method of aging a fuel cell according to a second embodiment (over-humidified gas aging: hydrogen pump)
Figure 12B:
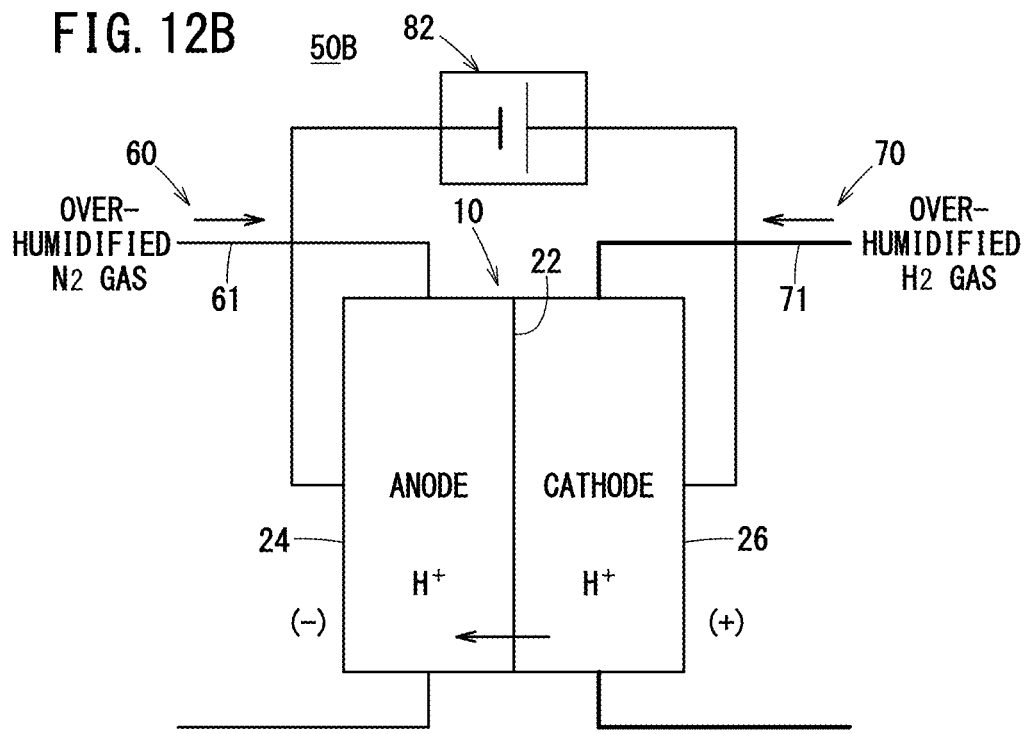
FIG. 12B is a diagram showing a second pattern of over-humidified gas aging (hydrogen pump)

The first pattern shown in FIG. 12A is a supply application pattern where the over-humidified $H_2$ gas is supplied to the anode 24 and a positive potential is applied to the anode 24, and the over-humidified $N_2$ gas is supplied to the cathode 26 and a negative potential, which is lower than that of the other electrode, is applied to the cathode 26. The second pattern shown in FIG. 12B is a reverse supply application pattern where the over-humidified $N_2$ gas is supplied to the anode 24 and the negative potential, which is lower than that of the other electrode, is applied to the anode 24, and the over-humidified $H_2$ gas is supplied to the cathode 26 and the positive potential is applied to the cathode 26. It should be noted that in the principle of this hydrogen pump, the control unit 54 may perform each of the first pattern and the second pattern of over-humidified gas aging once successively (e.g., perform the first pattern and then the second pattern, or perform the second pattern and then the first pattern). Alternatively, the control unit 54 may perform the first pattern and the second pattern multiple times at predetermined time intervals.

It should be noted that using the electronic load apparatus 80 (see FIG. 1) instead of the potential application unit 82, the aging apparatus 50B can supply electrical current to one of the anode and the cathode (or alternately) to apply the potential difference as in the case of the potential application unit 82.

In the first pattern, as shown in FIG. 13, the aging apparatus 50B supplies the over-humidified $H_2$ gas to the anode flow field 30 and the anode 24 by the first distribution unit 60, and supplies the over-humidified $N_2$ gas to the cathode flow field 32 and the cathode 26 by the second distribution unit 70. $H_2$ and $H_2O$ move to the catalyst layer 24a through the gas diffusion layer 24c and the dense carbon layer 24b by the pressure of the over-humidified $H_2$ gas at the anode 24. In particular, the control unit 54 performs control to cause the pressure on the anode 24 side to become higher than the pressure on the cathode 26 side. In this manner, it becomes possible to move $H_2$ and $H_2O$ to the catalyst layer 24a more easily. Then, $H_2$ reacts with the platinum catalyst, and is ionized into protons (H+) and electrons (e−).

Further, the potential application unit 82 applies a positive potential to the anode 24, and applies a negative potential, which is lower than that of the other electrode, to the cathode 26. In this manner, the ionized electrons move to the separator of the anode 24, and moves to the separator of the cathode 26 through the harnesses 56, the electronic load apparatus 80, and the potential application unit 82. That is, a large number of electrons move to the cathode 26, and as a result, the cathode 26 attracts protons. Accordingly, the protons of the catalyst layer 24a of the anode 24 are accompanied with electro osmosis water, and move inside the MEA 18. The protons and electrons that have moved to the catalyst layer 26a of the cathode 26 react with the platinum catalyst to generate $H_2$, and this $H_2$ is discharged from the fuel cell 10 together with the over-humidified $N_2$ gas.

Referring back to FIG. 12B, in the aging apparatus 50B, in the second pattern, the supply target electrode of the over humidified gas (the over-humidified $H_2$ gas, the over-humidified $N_2$ gas) is interchanged with respect to the first pattern, and the voltage application target electrode is interchanged with respect to the first pattern. Therefore, in the fuel cell 10, in the manner opposite to the above, the protons move from the cathode 26 to the anode 24 through the electrolyte membrane 22, and humidification by electro osmosis water can be performed from the cathode 26 side (specific operation of the fuel cell 10 is omitted.)

As described above, in the method of aging the fuel cell 10, also in the over-humidified gas aging utilizing the principle of the hydrogen pump, the same advantages as in the case of the first embodiment are obtained. That is, in this aging method, the diffusion coefficient of protons in the MEA 18 increases, and the amount of electro osmotic water associated with movement of protons also increases as well. Thus, it is possible to efficiently increase the water content of MEA 18 (electrolyte membrane 22). In particular, the over-humidified gas aging using the principle of the hydrogen pump can improve the movement efficiency of protons by movement of the electrons by application of the DC voltage.

Third Embodiment

Figure 14:
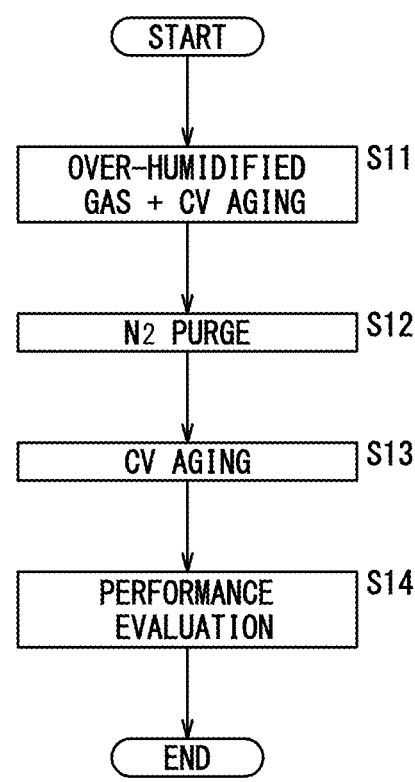
FIG. 14 is a flow chart showing a method of aging a fuel cell according to a third embodiment.

The method of aging the fuel cell 10 according to the third embodiment is different from the method of aging the fuel cell 10 according to the first and second embodiments in that, as shown in FIG. 14, at the time of performing the over-humidified gas aging, the CV aging is performed in combination. It should be noted that the aging apparatus 50B in the second embodiment can be used as the apparatus for performing the over-humidified gas aging. That is, in the case of performing the over-humidified gas aging and the CV aging at the same time, over-humidified gas aging utilizing the principle of the hydrogen pump is performed.

Specifically, in the aging method, the over-humidified gas+CV aging (step S11), the $N_2$ purge (step S12), the CV aging (step S13), and the performance evaluation (step S14) are performed successively. In the over-humidified gas+CV aging, the control unit 54 supplies the over-humidified $H_2$ gas and the over-humidified $N_2$ gas respectively to the pair of electrodes, and varies the voltage applied to the anode 24 and the cathode 26 by the potential application unit 82. As a result, in the fuel cells 10 subjected to the over-humidified gas+CV aging, the water content amount of the electrolyte membrane 22 is increased, and the effective area of the catalyst is improved.

Therefore, in the aging method, the time for performing the CV aging (step S13) after the $N_2$ purge (step S12) can be shortened to a greater extent. Further, even in a case where the time for the CV aging is shortened by performing the over-humidified gas+CV aging in the above manner, it is possible to significantly improve the power generation performance of the fuel cell stack 12. Incidentally, in the method of aging the fuel cell 10 according to the third embodiment, it is a matter of course that in the case where the over-humidified gas+CV aging is performed and as a result, the power generation performance of the fuel cell 10 is improved sufficiently, the CV aging may be omitted.

The technical concept and advantageous effects understood from the above embodiments will be described below.

According to a first aspect of the preset invention, a method of aging the fuel cell 10 is provided. The fuel cell 10 includes the electrolyte membrane 22 and a pair of electrodes (the anode 24, the cathode 26) provided on both surfaces of the electrolyte membrane 22. The method includes the steps of performing a first pattern of supplying a humidified hydrogen gas to one electrode of the pair of electrodes and supplying a humidified inert gas to the other electrode of the pair of electrodes, to thereby move protons from the one electrode to the other electrode through the electrolyte membrane 22, and performing a second pattern of supplying the humidified inert gas to the one electrode and supplying the humidified hydrogen gas to the other electrode, to thereby move protons from the other electrode to the one electrode through the electrolyte membrane 22.

According to the above, in the method of aging the fuel cell 10, it is possible to humidify the electrolyte membrane 22 from both sides of the electrolyte membrane 22 of the fuel cell 10, by the humidified hydrogen gas. That is, the protons ionized from the hydrogen at the catalyst layer 24a (or the catalyst layer 26a) is accompanied with electro osmosis water and move from one side to the other side of the electrolyte membrane 22, and move from the other side to the one side of the electrolyte membrane, and thus it is possible to facilitate humidification of the electrolyte membrane 22 to a greater extent. In this manner, with the aging method, it is possible to achieve improvement in the efficiency of aging the fuel cell 10.

Further, the first pattern and the second pattern are alternately repeated multiple times. In this manner, in the aging method, it is possible to more uniformly humidify the electrolyte membrane 22, and improve the aging efficiency to a greater extent.

Further, the first pattern and the second pattern are performed in the state where a load (electronic load apparatus 80) is electrically connected to the pair of electrodes (the anode 24 and the cathode 26), and movement of the protons is facilitated based on a concentration difference of the hydrogen gas supplied to either one of the pair of electrodes.

In this manner, in the aging method, it is possible to suppress the power consumption amount, and efficiently humidify the electrolyte membrane 22.

Further, the first pattern and the second pattern are performed in the state where a potential application unit 82 for applying potentials to the pair of electrodes (the anode 24 and the cathode 26) is connected, and in the first pattern, the potential application unit 82 applies a positive potential to the one electrode and applies a negative potential, which is lower than that of the one electrode, to the other electrode, to thereby facilitate movement of the protons based on the potential difference, and in the second pattern, the potential application unit 82 applies a negative potential, which is lower than that of the other electrode, to the one electrode and applies a positive potential to the other electrode, to thereby facilitate movement of the protons based on the potential difference. In this manner, in the aging method, it is possible to move the protons toward the electrolyte membrane 22 by the electrons ionized from the hydrogen, and perform the aging more efficiently.

Further, the pressure on the side to which the hydrogen gas is supplied is set to be higher than the pressure on the side the inert gas is supplied. In this manner, in the aging method, it is possible to efficiently move the humidified $H_2$ gas to the catalyst layers 24a, 26a in the electrodes.

Further, at the time of switching between the first pattern and the second pattern, the pressure on the side to which the hydrogen gas is supplied is decreased to thereby reduce the differential pressure between the pressure on the side to which the hydrogen gas is supplied and the pressure on the side to which the inert gas is supplied. In this manner, in the aging method, at the end of the first pattern or the second pattern, it is possible to suppress overload, etc. on the electrolyte membrane 22 due to rapid pressure change.

Further, at the time of switching between the first pattern and the second pattern, the inert gas is supplied to the side to which the hydrogen gas has been supplied, to thereby purge the hydrogen gas from the electrode. In this manner, in the aging method, it is possible to simply discharge the hydrogen remaining at the electrode.

Further, at the time of performing the first pattern and the second pattern, the applied voltage is varied within a predetermined voltage range. In this manner, in the aging method, it is possible to perform the over-humidified gas aging and CV aging in combination, and shorten the time required for performing the aging to a greater extent.

Further, according to a second aspect of the present invention, the aging apparatus 50, 50A, 50B is provided. The aging apparatus 50, 50A, 50B performs aging of the fuel cell 10. The fuel cell 10 includes the electrolyte membrane 22 and a pair of electrodes (the anode 24, the cathode 26) provided on both surfaces of the electrolyte membrane 22. The aging apparatus 50, 50A, 50B includes the hydrogen gas supply unit (the $H_2$ gas source 64, 74, 130, the bubbler tank 63, 73, the $H_2$ bubbler tank 134) capable of supplying the humidified hydrogen gas to the fuel cell 10, the inert gas supply unit (the $N_2$ gas source 65, 75, 112, the bubbler tank 63, 73, 116) capable of supplying the humidified inert gas to the fuel cell 10, and the control unit 54 for controlling the hydrogen gas supply unit and the inert gas supply unit. The control unit 54 performs a first pattern of supplying the humidified hydrogen gas to one of the pair of electrodes and supplying the humidified inert gas to the other of the pair of electrodes, to thereby move protons from the one electrode to the other electrode through the electrolyte membrane 22, and a second pattern of supplying the humidified inert gas to the one electrode and supplying the humidified hydrogen gas to the other electrode, to thereby move the protons from the other electrode to the one electrode through the electrolyte membrane 22. In this manner, in the aging apparatus 50, 50A, 50B, it becomes possible to facilitate humidification of the electrolyte membrane 22 to a greater extent, and achieve improvement in the aging efficiency.

The present invention is not particularly limited to the embodiment described above, and various modifications are possible without departing from the essence and gist of the present invention.

What is claimed is:

1. A method of aging a fuel cell, the fuel cell comprising an electrolyte membrane and a pair of electrodes provided on both surfaces of the electrolyte membrane, the method comprising:

performing a first pattern of supplying a humidified hydrogen gas to one electrode of the pair of electrodes and supplying a humidified inert gas to another electrode of the pair of electrodes, to thereby move protons from the one electrode to the other electrode through the electrolyte membrane; and performing a second pattern of supplying the humidified inert gas to the one electrode and supplying the humidified hydrogen gas to the other electrode, to thereby move protons from the other electrode to the one electrode through the electrolyte membrane, wherein protons in the electrolyte membrane move in a first direction in the first pattern, protons in the electrolyte membrane move in a second direction in the second pattern, and the first direction and the second direction are opposite to each other.

2. The method of aging the fuel cell according to claim 1, wherein the first pattern and the second pattern are alternately repeated multiple times.

3. The method of aging the fuel cell according to claim 1, wherein the first pattern and the second pattern are performed in a state where a load is electrically connected to the pair of electrodes; and movement of the protons is facilitated based on a concentration difference of the hydrogen gas supplied to either one of the pair of electrodes.

4. The method of aging the fuel cell according to claim 1, wherein a pressure on a side to which the hydrogen gas is supplied is set to be higher than a pressure on a side to which the inert gas is supplied.

5. The method of aging the fuel cell according to claim 4, wherein, at a time of switching between the first pattern and the second pattern, the pressure on the side to which the hydrogen gas is supplied is decreased to thereby reduce a differential pressure between the pressure on the side to which the hydrogen gas is supplied and the pressure on the side to which the inert gas is supplied.

6. The method of aging the fuel cell according to claim 1, wherein, at a time of switching between the first pattern and the second pattern, the inert gas is supplied to a side to which the hydrogen gas has been supplied, to thereby purge the hydrogen gas from the electrode.

7. The method of aging the fuel cell according to claim 1, wherein at a time of performing the first pattern and the second pattern, an applied voltage is varied within a predetermined voltage range.

8. A method of aging a fuel cell, the fuel cell comprising an electrolyte membrane and a pair of electrodes provided on both surfaces of the electrolyte membrane, the method comprising:

performing a first pattern of supplying a humidified hydrogen gas to one electrode of the pair of electrodes and supplying a humidified inert gas to another electrode of the pair of electrodes, to thereby move protons from the one electrode to the other electrode through the electrolyte membrane; and performing a second pattern of supplying the humidified inert gas to the one electrode and supplying the humidified hydrogen gas to the other electrode, to thereby move protons from the other electrode to the one electrode through the electrolyte membrane, wherein protons in the electrolyte membrane move in a first direction in the first pattern, protons in the electrolyte membrane move in a second direction in the second pattern, and the first direction and the second direction are opposite to each other, the first pattern and the second pattern are performed in a state where a potential application unit configured to apply potentials to the pair of electrodes is connected; and in the first pattern, the potential application unit applies a positive potential to the one electrode and applies a negative potential, which is lower than that of the one electrode, to the other electrode, to thereby facilitate movement of the protons based on a potential difference, and in the second pattern, the potential application unit applies a negative potential, which is lower than that of the other electrode, to the one electrode and applies a positive potential to the other electrode, to thereby facilitate movement of the protons based on a potential difference.

* * * * *